US010100258B2

(12) United States Patent
Humphreys et al.

(10) Patent No.: US 10,100,258 B2
(45) Date of Patent: Oct. 16, 2018

(54) BALLISTIC HEATING PROCESS

(75) Inventors: Leonard James Humphreys, Roseville Chase (AU); Peter Waldemar Klatt, Point Clare (AU); Mathew Bennett, Thornleigh (AU)

(73) Assignees: IGNITE RESOURCES PTY LTD, North Sydney (AU); LICELLA PTY LIMITED, North Sydney (AU); LICELLA FIBRE FUELS PTY LTD, Somersby (AU)

( * ) Notice: Subject to any disclaimer, the term of this patent is extended or adjusted under 35 U.S.C. 154(b) by 831 days.

(21) Appl. No.: 13/807,451

(22) PCT Filed: Jun. 29, 2011

(86) PCT No.: PCT/AU2011/000802
§ 371 (c)(1),
(2), (4) Date: Mar. 15, 2013

(87) PCT Pub. No.: WO2012/000033
PCT Pub. Date: Jan. 5, 2012

(65) Prior Publication Data
US 2013/0205652 A1 Aug. 15, 2013

(30) Foreign Application Priority Data
Jul. 1, 2010 (AU) .................... 2010902938

(51) Int. Cl.
*C10G 1/04* (2006.01)
*C10G 1/00* (2006.01)
(Continued)

(52) U.S. Cl.
CPC ............ *C10G 1/04* (2013.01); *C10G 1/002* (2013.01); *C10G 1/047* (2013.01); *C10G 1/08* (2013.01);
(Continued)

(58) Field of Classification Search
USPC .................................................. 44/307, 639
See application file for complete search history.

(56) References Cited

U.S. PATENT DOCUMENTS

| 4,266,083 A | 5/1981 | Huang |
| 5,232,604 A | 8/1993 | Swallow et al. |

(Continued)

FOREIGN PATENT DOCUMENTS

| EP | 0204354 B1 | 5/1990 |
| EP | 1489046 A1 | 12/2004 |

(Continued)

OTHER PUBLICATIONS

International Search Report for the International Application No. PCT/AU2011/000802, dated Aug. 26, 2011.
(Continued)

*Primary Examiner* — Ellen McAvoy
*Assistant Examiner* — Chantal Graham
(74) *Attorney, Agent, or Firm* — McDonnell Boehnen Hulbert & Berghoff LLP

(57) ABSTRACT

The invention relates generally to the field of biofuel synthesis. More specifically, the invention relates to processes for the synthesis of biofuels from organic materials including lignocellulosic biomass and coal. Also provided are biofuel products obtained from processes of the invention.

21 Claims, 5 Drawing Sheets

(51) Int. Cl.
 C10G 3/00 (2006.01)
 C10L 1/02 (2006.01)
 C10L 1/04 (2006.01)
 C10G 1/08 (2006.01)
(52) U.S. Cl.
 CPC ............... C10G 3/44 (2013.01); C10L 1/02 (2013.01); C10L 1/04 (2013.01); C10G 2300/1014 (2013.01); C10G 2300/4006 (2013.01); C10G 2300/4012 (2013.01); C10G 2300/44 (2013.01); Y02E 50/13 (2013.01); Y02E 50/30 (2013.01); Y02E 50/343 (2013.01); Y02P 30/20 (2015.11)

(56) References Cited

U.S. PATENT DOCUMENTS

| | | | |
|---|---|---|---|
| 5,959,167 A | 9/1999 | Shabtai et al. | |
| 5,997,751 A * | 12/1999 | Higo | B01J 3/00 210/758 |
| 6,090,291 A | 7/2000 | Akai et al. | |
| 2008/0221344 A1 | 9/2008 | Gleason et al. | |
| 2009/0004529 A1 * | 1/2009 | Gur | H01M 8/04007 429/425 |
| 2009/0005582 A1 | 1/2009 | Anderson | |
| 2010/0069626 A1 * | 3/2010 | Kilambi | C08H 8/00 536/56 |
| 2010/0152509 A1 | 6/2010 | Ekman | |
| 2011/0209387 A1 * | 9/2011 | Humphreys | C10L 1/02 44/307 |

FOREIGN PATENT DOCUMENTS

| | | |
|---|---|---|
| WO | 81/00855 A1 | 4/1981 |
| WO | 94/18128 A1 | 8/1994 |
| WO | 00/23540 A1 | 4/2000 |
| WO | 2006/117002 A2 | 11/2006 |
| WO | 2009/015409 A1 | 2/2009 |
| WO | 2010/009343 A2 | 1/2010 |
| WO | 2010/012026 A1 | 2/2010 |
| WO | 2010/037178 A1 | 4/2010 |

OTHER PUBLICATIONS

European Search Report for Application No. 11799964.9-1371 / 2588566—PCT/AU2011000802, dated Mar. 3, 2016.
Minami et al. "Decomposition behavior of woody biomass in water-added supercritical methanol," J Wood Sci 51:395-400 (2005).
Williams et al. "Subcritical and Supercritical Water Gasification of Cellulose, Starch, Glucose, and Biomass Waste," Energy & Fuels 20:1259-1265 (2006).
Yamazaki et al. "Liquefaction of beech wood in various supercritical alcohols," J Wood Sci 52:527-532 (2006).

* cited by examiner

BALLISTIC HEATING PROCESS

CROSS-REFERENCE TO RELATED APPLICATIONS

This application is a US national phase of International Application No. PCT/AU2011/000802 filed on Jun. 29, 2011, which claims the benefit of Australian provisional patent application 2010902938, filed Jul. 1, 2010, the disclosures of which are incorporated herein by reference in their entirety.

TECHNICAL FIELD

The invention relates generally to the field of biofuel synthesis. More specifically, the invention relates to processes for the synthesis of biofuels from organic materials including lignocellulosic biomass and coal. Also provided are biofuel products obtained from processes of the invention.

BACKGROUND

The global demand for energy and in particular liquid transport fuels continues to rise while the supply, based on ever decreasing conventional fossil reserves (e.g. oil, gas, and natural gas liquids) is threatened. A peak in oil production imposed by dwindling petroleum reserves raises the possibility of a global fuel crisis, particularly if the demand for transport fuels continues to rise as predicted. Hence, there is increased focus on the exploitation of previously unconventional fuel resources (e.g. heavy oil, oil sands, oil shale) and other non-fossil sources of energy (e.g. lignocellulosic materials).

A significant amount of research in the field of "alternative" energy production has focussed on the generation of biofuels from lignocellulosic matter. This technology raises the prospect of a shift to an abundant and renewable feedstock for energy production as an alternative to the depleting reserves of hydrocarbon-based raw materials. The enrichment of low energy density fossil fuels (e.g. lignite, peat and oil shale) into high energy fuel products also represents an attractive alternative given the relative abundance of those resources.

Despite having considerable potential most techniques for the production of fuels from lignocellulosic matter or fossilised organic materials are poorly cost-efficient and/or do not provide fuel products of adequate quality to be commercially viable. For example, current processes for the production of biofuels from lignocellulosic matter usually involve separation of feedstocks into different components via a series of complex and time-consuming steps, and in many cases require the use of expensive hydrolytic enzymes and fermenting microorganisms. In addition to these disadvantages, most current processes fail to utilise a significant proportion of feedstock material which is not converted into fuel and often goes to waste. Moreover, biofuels produced by current processes (e.g. pyrolysis) typically comprise a significantly higher oxygen content than conventional fuels. Hence, their energy density is comparatively low and their poor stability makes processing (e.g. storage, blending with conventional fuels, upgrading) difficult.

Current processes for biofuel production typically require the use of a bioreactor to generate and/or maintain the levels of heat and pressure necessary for biomass conversion. Typically, the material under treatment is maintained at target temperatures via heat transfer through reactor walls (e.g. vessel walls and/or tank walls), driven by a large temperature differential across the wall outside and inside, using heat exchangers and the like. Apart from a loss of energy, maintaining high reaction temperatures by heat transfer through reactor walls often causes hot-spots, inducing pyrolysis and carbonisation of material on the walls resulting in clogging and blockages. This is a particular issue when operating close to the pyrolysis temperature regime onset, as small fluctuations can induce significant carbonisation. Furthermore, it is difficult to achieve and maintain high target temperatures using this type of heat transfer when the diameter of the reactor is increased to accommodate treatment of large volumes of feedstock. Typically, larger vessels/tanks have reduced capacity for effective heat transfer and, hence, "scaling-up" requires the input of a much larger amount of energy coupled to an even bigger temperature differential across the wall and/or the use of an impractically large surface area to achieve high target temperatures. Transfer of heat to the material under treatment is also generally slower which can result in undesirable side reactions (e.g. polymerisations) and generally leads to lower controllability.

A need exists for improved methods and/or apparatuses for producing biofuels from organic matter which overcome at least one of the aforementioned disadvantages.

SUMMARY OF THE INVENTION

The present invention alleviates one or more deficiencies referred to above by providing a method and apparatus for the production of biofuel from organic matter in a single treatment stage.

In a first aspect, the invention provides a method for producing a biofuel from organic matter, the method comprising the steps of:

(i) generating a supercritical aqueous solvent;

(ii) contacting the organic matter with the supercritical aqueous solvent to form a reaction mixture, wherein said contacting causes a supercritical to subcritical phase change in the aqueous solvent; and (iii) treating the reaction mixture at a temperature of between about 250° C. and about 400° C., and a pressure of between about 100 bar and about 300 bar.

In a second aspect, the invention provides a method for producing a biofuel from organic matter, the method comprising the steps of:

(i) generating a supercritical aqueous solvent;

(ii) contacting the organic matter with the supercritical aqueous solvent to form a reaction mixture; and (iii) treating the reaction mixture at a temperature of between about 250° C. and about 400° C., and a pressure of between about 100 bar and about 300 bar.

In one embodiment of the first and second aspect, the organic matter of step (ii) is at a temperature below the critical point of the aqueous solvent prior to said contacting.

In another embodiment of the first and second aspect, the organic matter of step (ii) is at a pressure below the critical point of the aqueous solvent prior to said contacting.

In another embodiment of the first and second aspect, the organic matter of step (ii) is at a temperature and a pressure below the critical point of the aqueous solvent prior to said contacting.

In one embodiment of the first and second aspect, the supercritical aqueous solvent comprises alcohol.

In one embodiment of the first and second aspect, the supercritical aqueous solvent comprises ethanol.

In one embodiment of the first and second aspect, the supercritical aqueous solvent comprises methanol.

In another embodiment of the first and second aspect, the organic matter is provided in the form of a slurry.

In one embodiment of the first and second aspect, the slurry comprises alcohol.

In one embodiment of the first and second aspect, the slurry comprises ethanol.

In one embodiment of the first and second aspect, the slurry comprises methanol.

In one embodiment of the first and second aspect, the slurry comprises between about 1% and about 40% alcohol (e.g. ethanol and/or methanol) by weight.

In another embodiment of the first and second aspect, the slurry comprises between about 1% and about 20% alcohol (e.g. ethanol and/or methanol) by weight.

In another embodiment of the first and second aspect, the slurry comprises between about 10% and about 30% alcohol (e.g. ethanol and/or methanol) by weight.

In one embodiment of the first and second aspect, the treating is performed under conditions of continuous flow.

In another embodiment of the first and second aspect, the contacting and treating are performed under conditions of continuous flow.

In another embodiment of the first and second aspect, the minimum (volume-independent) flow velocity of the slurry under said continuous flow conditions is greater than the settling velocity of solid matter within the slurry.

In one embodiment of the first and second aspect, the minimum (volume-independent) flow velocity of the slurry under said continuous flow conditions is above 0.01 cm/s.

In another embodiment of the first and second aspect, the minimum (volume-independent) flow velocity of the slurry under said continuous flow conditions is above 0.05 cm/s.

In an additional embodiment of the first and second aspect, the minimum (volume-independent) flow velocity of the slurry under said continuous flow conditions is above about 0.5 cm/s.

In a further embodiment of the first and second aspect, the minimum (volume-independent) flow velocity of the slurry under said continuous flow conditions is above about 1.5 cm/s.

In one embodiment of the first and second aspect, the organic matter is provided for contact with the supercritical aqueous solvent at a temperature of between about 10° C. and about 30° C. and a pressure of between about 220 bar and about 280 bar.

In one embodiment of the first and second aspect, the organic matter is provided for contact with the supercritical aqueous solvent at a temperature of between about 150° C. and about 320° C. and a pressure of between about 220 bar and about 280 bar.

In one embodiment of the first and second aspect, the organic matter is provided for contact with the supercritical aqueous solvent at a temperature of about 20° C. and a pressure of about 240 bar or about 260 bar.

In one embodiment of the first and second aspect, the organic matter is provided for contact with the supercritical aqueous solvent at a temperature of about 300° C. and a pressure of about 240 bar or about 260 bar.

In another embodiment of the first and second aspect, the supercritical aqueous solvent is provided for contact with the organic matter at a temperature of between about 300° C. and about 600° C. and a pressure of between about 100 bar and about 350 bar.

In another embodiment of the first and second aspect, the supercritical aqueous solvent is provided for contact with the organic matter at a temperature of between about 350° C. and about 500° C. and a pressure of between about 200 bar and 250 bar.

In another embodiment of the first and second aspect, the supercritical aqueous solvent is provided for contact with the organic matter at a temperature of about 400° C. or about 450° C. and a pressure of about 220 bar or about 240 bar.

In one embodiment of the first and second aspect, the reaction mixture comprises an additional catalyst that originates independently of other reaction mixture components and components of a reaction vessel in which any one or more of steps (i), (ii) and (iii) is, or are, performed.

In one embodiment of the first and second aspect, the additional catalyst is not present, or is substantially not present, in any one or more of the organic matter, the aqueous solvent, or a reactor vessel wall.

In another embodiment of the first and second aspect, the additional catalyst is also present in any one or more of the organic matter, the aqueous solvent, or a reactor vessel wall.

In one embodiment of the first and second aspect, the additional catalyst is a base catalyst.

In a further embodiment of the first and second aspect, the base catalyst is an alkali metal hydroxide catalyst or a transition metal hydroxide catalyst.

In a further embodiment of the first and second aspect, the base catalyst is sodium hydroxide or potassium hydroxide.

In a further embodiment of the first and second aspect, the treating comprises use of at least one additional catalyst that enhances incorporation of hydrogen into the organic matter.

In one embodiment of the first and second aspect, the additional catalyst that enhances the incorporation of hydrogen into the organic matter is selected from the group consisting of alkali metal formate catalysts, transition metal formate catalysts, reactive carboxylic acid catalysts, transition metal catalysts, sulphide catalysts, noble metal catalysts, water-gas-shift catalysts, and combinations thereof.

In a further embodiment of the first and second aspect, the additional catalyst is sodium formate.

In a further embodiment of the first and second aspect, the treating comprises use of at least one additional catalyst that enhances removal of oxygen from the organic matter.

In one embodiment of the first and second aspect, the additional catalyst that enhances the removal of oxygen from the organic matter is selected from the group consisting of acid catalysts, reactive carboxylic acid catalysts, alkali metal formate catalysts, transition metal formate catalysts, transition metal catalysts, supported transition metal catalysts, solid acid catalysts, noble metal catalysts, sulphide catalysts, water-gas-shift catalysts, and combinations thereof.

In one embodiment of the first and second aspect, the additional catalyst or additional catalysts is/are added to the reaction mixture after said contacting of the organic matter with the supercritical aqueous solvent.

In one embodiment of the first and second aspect, the additional catalyst or additional catalysts is/are added to the organic matter prior to said contacting with the supercritical aqueous solvent.

In one embodiment of the first and second aspect, the additional catalyst or additional catalysts is/are added to the aqueous solvent prior to said contacting with the organic matter.

In one embodiment of the first and second aspect, the additional catalyst or additional catalysts is/are added to the aqueous solvent and organic matter during said contacting.

In one embodiment of the first and second aspect, the organic matter is fossilised organic matter having a carbon content of at least 50%, and said supercritical aqueous solvent is water.

In another embodiment of the first and second aspect, the organic matter is fossilised organic matter having a carbon content of at least 60%, and the supercritical aqueous solvent is water.

In a further embodiment of the first and second aspect, said temperature of step (iii) is between about 270° C. and about 380° C., and said pressure of step (iii) is between about 150 bar and about 270 bar.

In a further embodiment of the first and second aspect, the fossilised organic matter is lignite, said temperature of step (iii) is between about 330° C. and about 370° C., and said pressure of step (iii) is between about 200 bar and about 280 bar.

In one embodiment of the first and second aspect, the organic matter is lignocellulosic matter, and the reaction mixture comprises alcohol.

In a further embodiment of the first and second aspect, the alcohol is added to the reaction mixture after said contacting of the organic matter with the supercritical aqueous solvent.

In a further embodiment of the first and second aspect, the supercritical aqueous solvent comprises the alcohol.

In a further embodiment of the first and second aspect, the alcohol is added to the organic matter prior to contacting the organic matter with the supercritical aqueous solvent.

In another embodiment of the first and second aspect, the lignocellulosic matter comprises more than about 10% of each of lignin, cellulose, and hemicellulose.

In a further embodiment of the first and second aspect, said temperature of step (iii) is between about 270° C. and about 380° C., said pressure of step (iii) is between about 150 bar and about 270 bar, and said reaction mixture comprises between about 0% and about 40% alcohol by weight relative to water content in the reaction mixture (i.e. alcohol:water ratio in reaction mixture of between about 0:10 and about 4:6).

In a further embodiment of the first and second aspect, said temperature of step (iii) is between about 270° C. and about 380° C., said pressure of step (iii) is between about 150 bar and about 270 bar, and said reaction mixture comprises between about 0% and about 20% alcohol by weight relative to water content in the reaction mixture (i.e. alcohol:water ratio in reaction mixture of between about 0:10 and about 2:8).

In a further embodiment of the first and second aspect, said temperature is between about 300° C. and about 340° C., said pressure is between about 180 bar and about 260 bar, and said reaction mixture comprises between about 10% and about 30% alcohol by weight relative to water content in the reaction mixture.

In one embodiment of the first and second aspect, the alcohol is ethanol, methanol, or a mixture thereof.

In one embodiment of the first and second aspect, the treating is for a time period of between about 5 minutes and about 40 minutes.

In another embodiment of the first and second aspect, the treating is for a time period of between about 20 minutes and about 30 minutes.

In another embodiment of the first and second aspect, the pressure let down device comprises a sealed collection vessel including a cooling jacket extending around its periphery.

In one embodiment of the first and second aspect, the cooling jacket comprises ambient temperature water.

In one embodiment of the first and second aspect, the biofuel comprises one or more of an oil component, a char component and a gaseous component comprising methane, hydrogen, carbon monoxide and carbon dioxide.

In one embodiment of the first and second aspect, the biofuel comprises an oil component having a gross calorific value of more than 35 MJ/kg.

In one embodiment of the first and second aspect, the biofuel comprises an oil component having greater than about 8% wt db hydrogen and less than about 10% wt db oxygen.

In one embodiment of the first and second aspect, the biofuel comprises a char component having a gross calorific value of more than 30 MJ/kg.

In one embodiment of the first and second aspect, the biofuel is a bio-oil.

In a third aspect, the invention provides a biofuel produced by the method of the first or second aspect.

In one embodiment of the third aspect, the biofuel is a bio-oil.

In a fourth aspect, the invention provides a continuous flow apparatus for converting organic matter into biofuel, the apparatus comprising:

an injection device arranged to bring a supercritical solvent into direct contact with the organic matter, thereby facilitating a supercritical to subcritical phase change in the solvent;

one or more pumps for propelling the organic matter and supercritical solvent separately and under pressure into the injection device;

a reactor in communication with the injection device and operable to maintain the organic matter and solvent at target temperature(s) and pressure(s) for a defined time period; and a pressure let-down device.

In one embodiment of the fourth aspect, the injection device comprises first, second and third vessels each inserted into separate orifices of a sealed connecting piece, the first vessel passing through the connecting piece terminating within the third vessel and being operable to direct flow of material into the third vessel, and the connecting piece being operable to direct flow of material received from the second vessel into the third vessel for contact with material from the first vessel.

In another embodiment of the fourth aspect, the injection device comprises first, second and third vessels each in communication at a common junction, the first and second vessels being operable to direct flow of separate materials into the junction where said materials contact forming a mixture, and the third vessel being operable to direct flow of the mixture away from the junction.

In one embodiment of the fourth aspect, the injection device comprises a first outer vessel enclosing a second porous inner vessel, the second porous inner vessel passing entirely through the first outer vessel, and the first outer vessel comprising at least one orifice for receiving material for dissemination along a surface of the second porous inner vessel.

In a fifth aspect, the invention provides use of a continuous flow apparatus according to the fourth aspect for producing a biofuel from organic matter by a method according to the first or second aspect.

In one embodiment of the fifth aspect, the biofuel is a bio-oil.

BRIEF DESCRIPTION OF THE DRAWINGS

Preferred embodiments of the present invention will now be described, by way of an example only, with reference to the accompanying drawings wherein.

DEFINITIONS

Figure 1:
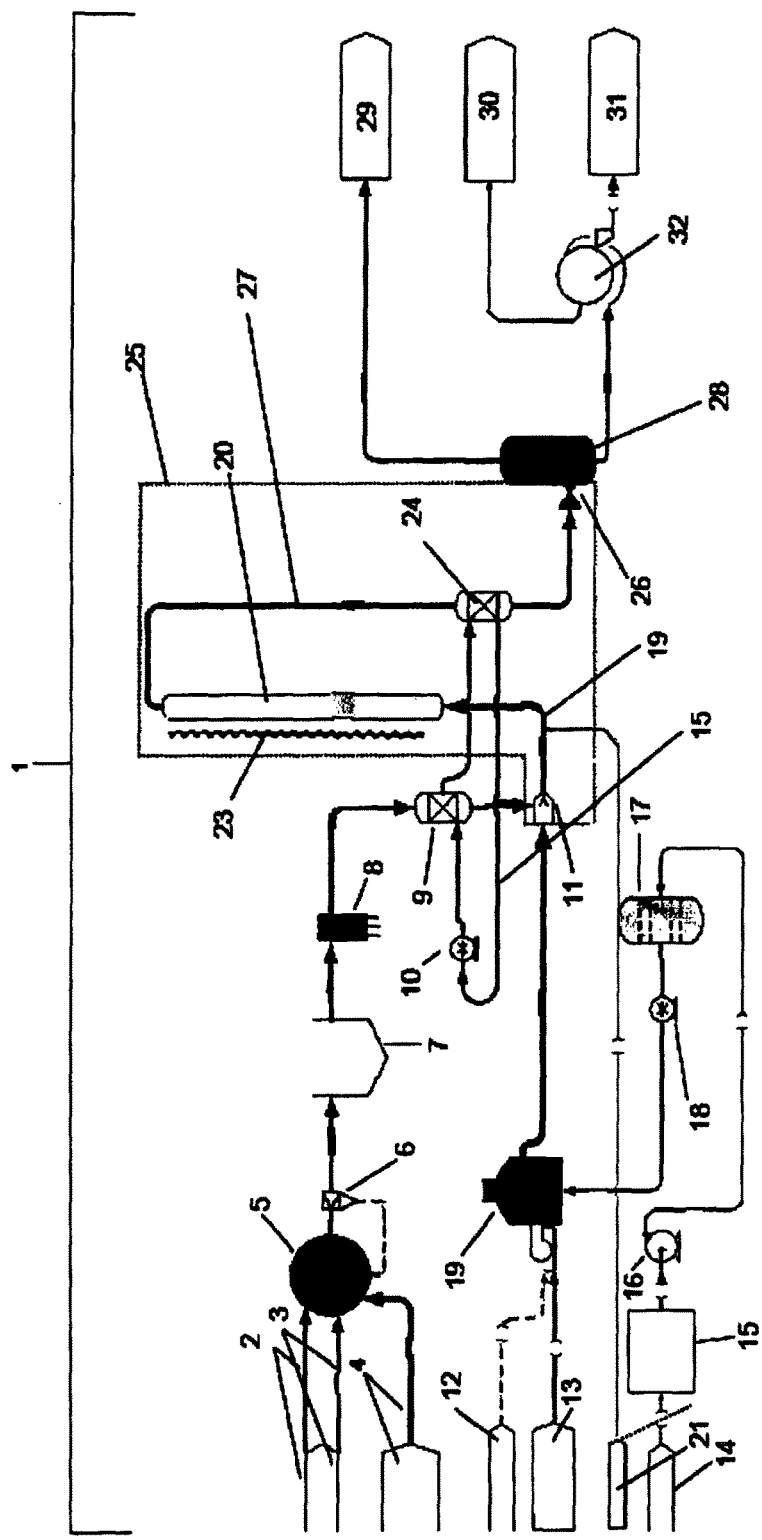
FIG. 1 is a schematic diagram of an apparatus for converting organic matter into biofuel in accordance with an embodiment of the invention.

As used herein, the singular forms "a", "an" and "the" include plural references unless the context clearly dictates otherwise. For example, the term "a catalyst" also includes a plurality of catalysts.

As used herein, the term "comprising" means "including". Variations of the word "comprising", such as "comprise" and "comprises", have correspondingly varied meanings. Thus, for example, a material "comprising" lignin and cellulose may consist exclusively of lignin and cellulose or may include other additional substances.

As used herein, the terms "organic matter" and "organic materials" have the same meaning and encompass any material comprising carbon including both fossilised and non-fossilised materials. Non-limiting examples of organic matter include biomass, lignocellulosic matter, and hydrocarbon-containing materials (e.g. lignite, oil shale and peat).

As used herein, the term "biofuel" refers to an energy-containing material derived from the processing of organic matter. Non-limiting examples of biofuels include oil products (i.e. bio-oils), char products (otherwise known as upgraded pulvarised coal injection (PCI) equivalent products), gaseous products, biodiesel, and alcohols (e.g. ethanol and butanol).

As used herein, the term "bio-oil" will be understood to encompass oil products derived from processing fossilised organic material (e.g. coals such as lignite), non-fossilised organic material (e.g. lignocellulosic matter), or mixtures thereof.

As used herein, the terms "lignocellulosic matter" and "lignocellulosic biomass" are used interchangeably and have the same meaning. The terms encompass any substance comprising lignin, cellulose, and hemicellulose.

As used herein, the term "aqueous solvent" refers to a solvent comprising at least one percent water based on total weight of solvent. An "aqueous solvent" may therefore comprise between one percent water and one hundred percent water based on total weight of solvent.

As used herein, the term "aqueous alcohol" refers to a solvent comprising at least one percent alcohol based on total weight of solvent.

As used herein, the term "aqueous ethanol" refers to a solvent comprising at least one percent ethanol based on total weight of solvent.

As used herein, the term "aqueous methanol" refers to a solvent comprising at least one percent methanol based on total weight of solvent.

As used herein, a "supercritical" substance (e.g. a supercritical solvent) refers to a substance that is heated above its critical temperature and pressurised above its critical pressure (i.e. a substance at a temperature and pressure above its critical point).

As used herein, a "subcritical" substance (e.g. a subcritical solvent) refers to a substance at a temperature and/or pressure below the critical point of the substance. Accordingly, a substance may be "subcritical" at a temperature below its critical point and a pressure above its critical point, at a temperature above its critical point and a pressure below its critical point, or at a temperature and pressure below its critical point.

As used herein, the term "intrinsic catalyst" will be understood to be a catalyst that is innately present in a given reaction component such as, for example, any one or more of organic matter feedstock, an aqueous solvent, and/or vessel walls of a reactor apparatus.

As used herein, an "additional catalyst" is a catalyst that is supplementary to catalytic compounds intrinsically present in organic matter treated in accordance with the methods of the invention, catalytic compounds intrinsically present in an aqueous solvent (including an aqueous alcohol) used in accordance with the methods of the invention, and/or catalytic compounds intrinsically present in the walls of a reactor apparatus used to perform the methods of the invention.

It will be understood that use of the term "about" herein in reference to a recited numerical value (e.g. a temperature or pressure) includes the recited numerical value and numerical values within plus or minus ten percent of the recited value.

It will be understood that use of the term "between" herein when referring to a range of numerical values encompasses the numerical values at each endpoint of the range. For example, a temperature range of between 10° C. and 15° C. is inclusive of the temperatures 10° C. and 15° C.

Any description of a prior art document herein, or a statement herein derived from or based on that document, is not an admission that the document or derived statement is a part of the common general knowledge of the relevant art.

For the purposes of description all documents referred to herein are incorporated by reference in their entirety unless otherwise stated.

DETAILED DESCRIPTION

Current techniques for biofuel production suffer from a number of deficiencies. The majority involve a series of complex reaction stages often requiring the addition of expensive reagents (e.g. hydrolytic enzymes). In addition, many fail to efficiently utilise/convert a significant proportion of raw input material. More significantly, biofuels generated by current techniques generally have a significantly increased oxygen content compared to conventional fuels which reduces their energy value and stability. Hence, these biofuels are difficult to store and/or process for downstream applications (e.g. blending with conventional fuels, upgrading). In light of these and other limitations, few currently available biofuel production techniques provide a commercially viable alternative to using conventional fuels.

Certain aspects of the present invention provide methods for the production of biofuels from organic matter. In contrast to existing techniques, the biofuel production methods described herein comprise a single treatment stage in which organic substrate material in converted into a biofuel. No separation of feedstock material into different components is required prior to performing the methods of the invention. In addition, the methods do not require the use of hydrolytic enzymes or microorganisms to ferment sugars. Rather, feedstock material is contacted with supercritical aqueous solvent causing a supercritical to subcritical phase change in the solvent. It will be understood that the aqueous solvent is in a supercritical state prior to contact with the organic matter. The resulting reaction mixture is then maintained under specific conditions of temperature and pressure for a period of time ("retention time") sufficient to produce a biofuel product. In preferred embodiments methods of the invention may be performed under conditions of continuous flow.

In addition to the particular reaction conditions and reagents used in the methods of the present invention, it is believed that the phase change of the solvent (i.e. supercritical to subcritical) caused by initial contact with the feedstock triggers a large release of energy which in turn enhances decomposition of the feedstock material and/or assists in driving its conversion into biofuel.

Additional catalysts may optionally be included in the reaction mixture to further enhance the efficiency of biofuel production. Without limitation to a particular mode of action, it is postulated that inclusion of the additional catalysts may assist in maintaining a reducing environment driving a series of reactions in which the substrate material is decomposed and altered by the reduction of oxygen and incorporation of hydrogen.

Certain aspects of the invention relate to biofuels produced by the methods of the present invention. The biofuels are characterised by low oxygen content, high energy density and/or increased stability in comparison to those produced by currently available methods. Accordingly, biofuels of the invention are more suitable for storage and/or blending with conventional fuels (e.g. diesel), and more easily upgraded into higher quality fuel products (if required).

Organic Matter

The present invention provides methods for the conversion of organic matter into biofuel. As used herein, "organic matter" (also referred to herein as "organic material") encompasses any matter comprising carbon, including both fossilised and non-fossilised forms of carbon-comprising matter.

No limitation exists regarding the particular type of organic matter utilised in the methods of the invention, although it is contemplated that certain forms of organic matter may be more suitable than others.

Organic matter utilised in the methods of the invention may be naturally occurring organic materials (e.g. lignocellulosic biomass or fossil fuel materials including lignite, oil shale, peat and the like) or synthetic organic materials (e.g. synthetic rubbers, plastics, nylons and the like).

Organic matter utilised in the methods of the invention may be fossilised organic material (e.g. lignite), non-fossilised organic material (e.g. lignocellulosic matter), or a mixture thereof.

It will be understood that the organic material may comprise mixtures of two or more different types of naturally-occurring organic materials, two or more different types of synthetic organic materials, or a mixture of naturally-occurring and synthetic organic materials. No limitation exists regarding the particular proportions of different components within the mixture.

Similarly, the organic material may comprise mixtures of two or more different types of fossilised organic matter, two or more different types of non-fossilised organic matter or a mixture of fossilised and non-fossilised organic matter. No limitation exists regarding the particular proportions of different components within the mixture.

In some preferred embodiments, organic matter utilised in the methods of the invention comprises fossilised organic matter. "Fossilised organic matter" as contemplated herein encompasses any organic material that has been subjected to geothermal pressure and temperature for a period of time sufficient to remove water and concentrate carbon to significant levels. For example, fossilised organic material may comprise more than about 10%, 20%, 30%, 40%, 50%, 60%, 70%, 75%, 80%, 85%, 90% or 95 wt % carbon. Preferably, the fossilised organic material may comprise more than about 50 wt % carbon, more than about 60 wt % carbon, or more than about 70% weight carbon. Non-limiting examples of such materials include coals (e.g. anthracitic coals such as meta-anthracite, anthracite and semianthracite; bituminous coals; subbituminous coals; lignite (i.e. brown coal), coking coal, coal tar, coal tar derivatives, coal char), cokes (e.g. high temperature coke, foundry coke, low and medium temperature coke, pitch coke, petroleum coke, coke oven coke, coke breeze, gas coke, brown coal coke, semi coke), peat (e.g. milled peat, sod peat), kerogen, tar sands, oil shale, shale tar, asphalts, asphaltines, natural bitumen, bituminous sands, or any combination thereof.

In other preferred embodiments, organic matter utilised in the methods of the invention comprises non-fossilised organic materials. A preferred form of non-fossilised organic material is lignocellulosic matter. As used herein, "lignocellulosic matter" refers to any substance comprising lignin, cellulose and hemicellulose.

For example, the lignocellulosic matter may be a woody plant or component thereof. Examples of suitable woody plants include, but are not limited to, pine (e.g. *Pinus radiata*), birch, eucalyptus, bamboo, beech, spruce, fir, cedar, poplar, willow and aspen. The woody plants may be coppiced woody plants (e.g. coppiced willow, coppiced aspen).

Additionally or alternatively, the lignocellulosic matter may be a fibrous plant or a component thereof. Non-limiting examples of fibrous plants (or components thereof) include grasses (e.g. switchgrass), grass clippings, flax, corn cobs, corn stover, reed, bamboo, bagasse, hemp, sisal, jute, cannibas, hemp, straw, wheat straw, abaca, cotton plant, kenaf, rice hulls, and coconut hair.

Additionally or alternatively, the lignocellulosic matter may be derived from an agricultural source. Non-limiting examples of lignocellulosic matter from agricultural sources include agricultural crops, agricultural crop residues, and grain processing facility wastes (e.g. wheat/oat hulls, corn fines etc.). In general, lignocellulosic matter from agricultural sources may include hard woods, soft woods, hardwood stems, softwood stems, nut shells, branches, bushes, canes, corn, corn stover, cornhusks, energy crops, forests, fruits, flowers, grains, grasses, herbaceous crops, wheat straw, switchgrass, *salix*, sugarcane bagasse, cotton seed hairs, leaves, bark, needles, logs, roots, saplings, short rotation woody crops, shrubs, switch grasses, trees, vines, cattle manure, and swine waste.

Additionally or alternatively, lignocellulosic matter may be derived from commercial or virgin forests (e.g. trees, saplings, forestry or timber processing residue, scrap wood such as branches, leaves, bark, logs, roots, leaves and products derived from the processing of such materials, waste or byproduct streams from wood products, sawmill and paper mill discards and off-cuts, sawdust, and particle boar).

Additionally or alternatively, industrial products and by-products may be used as a source of lignocellulosic matter. Non-limiting examples include wood-related materials and woody wastes and industrial products (e.g. pulp, paper (e.g. newspaper) papermaking sludge, cardboard, textiles and cloths, dextran, and rayon).

It will be understood that organic material used in the methods of the invention may comprise a mixture of two or more different types of lignocellulosic matter, including any combination of the specific examples provided above.

The relative proportion of lignin, hemicellulose and cellulose in a given sample will depend on the nature of the lignocellulosic matter.

By way of example only, the proportion of hemicellulose in a woody or fibrous plant used in the methods of the invention may be between about 15% and about 40%, the proportion of cellulose may be between about 30% and about 60%, and the proportion of lignin may be between about 5% and about 40%. Preferably, the proportion of hemicellulose in the woody or fibrous plant may be between about 23% and about 32%, the proportion of cellulose may be between about 38% and about 50%, and the proportion of lignin may be between about 15% and about 25%.

In some embodiments, lignocellulosic matter used in the methods of the invention may comprise between about 2% and about 35% lignin, between about 15% and about 45% cellulose, and between about 10% and about 35% hemicellulose.

In other embodiments, lignocellulosic matter used in the methods of the invention may comprise between about 20% and about 35% lignin, between about 20% and about 45% cellulose, and between about 20% and about 35% hemicellulose.

In some embodiments, the lignocellulosic matter may comprise more than about 5%, 10%, 15%, 20%, 25%, 30%, 35%, 40%, 45%, or 50% lignin.

In some embodiments, the lignocellulosic matter may comprise more than about 5%, 10%, 15%, 20%, 25%, 30%, 35%, 40%, 45%, or 50% cellulose.

In some embodiments, the lignocellulosic matter may comprise more than about 5%, 10%, 15%, 20%, 25%, 30%, 35%, 40%, 45%, or 50% hemicellulose.

The skilled addressee will recognize that the methods described herein are not constrained by the relative proportions of lignin, hemicellulose and cellulose in a given source of lignocellulosic matter.

Organic matter utilised in the methods of the invention may comprise a mixture of a fossilised organic matter and non-fossilised organic matter (e.g. lignocellulosic matter). Non-limiting examples of suitable fossilised and non-fossilised organic matter that may be included in the mixture are provided in the paragraphs above. It will be understood that no limitation exists regarding the relative proportion of the fossilised and non-fossilised organic matter in the mixture.

In certain embodiments of the invention, the mixture comprises lignite (brown coal) and lignocellulosic matter. The lignocellulosic matter of the mixture may, for example, comprise woody plant material and/or fibrous plant material. The proportion of lignite in the mixture may be greater than about 20%, 40%, 60% or 80%. Alternatively, the proportion of lignocellulosic matter in the mixture may be greater than about 20%, 40%, 60% or 80%.

In some preferred embodiments, organic matter utilised in the methods of the invention comprises carbon-containing polymeric materials, non-limiting examples of which include rubbers (e.g. tyres), plastics and polyamides (e.g. nylons).

Non-limiting examples of suitable rubbers include natural and synthetic rubbers such as polyurethanes, styrene rubbers, neoprenes, polybutadiene, fluororubbers, butyl rubbers, silicone rubbers, plantation rubber, acrylate rubbers, thiokols, and nitrile rubbers.

Non-limiting examples of suitable plastics include PVC, polyethylene, polystyrene, terphtalate, polyethylene and polypropylene.

Organic matter utilised in the methods of the invention may comprise carbon-containing wastes such as sewage, manure, or household or industrial waste materials.

Pre-Treatment of Organic Matter

Organic matter utilised in the methods of the invention may optionally be pre-treated prior to performing the conversion of the matter to biofuel.

It will be recognised that no strict requirement exists to perform a pre-treatment step when using the methods of the invention. For example, pre-treatment of the organic matter may not be required if it is obtained in the form of a liquid or in a particulate form. However, it is contemplated that in many cases pre-treatment of the organic matter may be advantageous in enhancing the outcome of the biofuel production methods described herein.

In general, pre-treatment may be used to break down the physical and/or chemical structure of the organic matter making it more accessible to various reagents utilised in the methods of the invention (e.g. aqueous solvent, catalysts) and/or other reaction parameters (e.g. heat and pressure). In certain embodiments, pre-treatment of organic matter may be performed for the purpose of increasing solubility, increasing porosity and/or reducing the crystallinity of sugar components (e.g. cellulose). Pre-treatment of the organic matter may be performed using an apparatus such as, for example, an extruder, a pressurized vessel, or batch reactor.

Pre-treatment of the organic matter may comprise physical methods, non-limiting examples of which include grinding, chipping, shredding, milling (e.g. commination processes such as vibratory ball milling, hammer milling, roller milling, pin milling, rod milling and the like), compression/expansion, agitation, and/or pulse-electric field (PEF) treatment.

Additionally or alternatively, pre-treatment of the organic matter may comprise physio-chemical methods, non-limiting examples of which include pyrolysis, steam explosion, ammonia fiber explosion (AFEX), ammonia recycle percolation (ARP), and/or carbon-dioxide explosion. For example, steam explosion involves exposing the organic matter to high pressure steam in a contained environment before the resulting product is explosively discharged to an atmospheric pressure. Pre-treatment with steam explosion may additionally involve agitation of the organic matter.

Additionally or alternatively, pre-treatment of the organic matter may comprise chemical methods, non-limiting examples of which include ozonolysis, acid hydrolysis (e.g. dilute acid hydrolysis using $H_2SO_4$ and/or HCl), alkaline hydrolysis (e.g. dilute alkaline hydrolysis using sodium, potassium, calcium and/or ammonium hydroxides), oxidative delignification (i.e. lignin biodegradation catalysed by the peroxidase enzyme in the presence of $H_2O_2$), and/or the organosolvation method (i.e. use of an organic solvent mixture with inorganic acid catalysts such as $H_2SO_4$ and/or HCl to break lignin-hemicellulose bonds).

Additionally or alternatively, pre-treatment of the organic matter may comprise biological methods, non-limiting examples of which include the addition of microorganisms (e.g. rot fungi) capable of degrading/decomposing various component(s) of the organic matter.

In preferred embodiments, organic matter used in the methods of the invention is provided in the form of a slurry.

The slurry may be generated, for example, by generating a particulate form of the organic matter (e.g. by physical methods such as those referred to above and/or by other means) and mixing with an appropriate liquid (e.g. an aqueous solvent).

The optimal particle size of solid components and the optimal concentration of solids in the slurry may depend upon factors such as, for example, the heat transfer capacity of the organic matter utilised (i.e. the rate at which heat can be transferred into and through individual particles), the desired rheological properties of the slurry and/or the compatibility of the slurry with component/s of a given apparatus within which the methods of the invention may be performed (e.g. reactor tubing). The optimal particle size and/or concentration of solid components in a slurry used for the methods of the invention can readily be determined by a person skilled in the art using standard techniques. For example, a series of slurries may be generated, each sample in the series comprising different particle sizes and/or different concentrations of solid components compared to the other samples. Each slurry can then be treated in accordance with the methods of the invention under a conserved set of reaction conditions. The optimal particle size and/or concentration of solid components can then be determined upon analysis and comparison of the products generated from each slurry using standard techniques in the art.

In certain embodiments of the invention, the particle size of solid components in the slurry may be between about 10 microns and about 10,000 microns. For example, the particle size may be more than about 50, 100, 500, 750, 1000, 2000, 3000, 4000, 5000, 6000, 7000, 8000 or 9000 microns. Alternatively, the particle size may less than about 50, 100, 500, 750, 1000, 2000, 3000, 4000, 5000, 6000, 7000, 8000 or 9000 microns. In some embodiments, the particle size is between about 10 microns and about 50 microns, between about 10 microns and about 100 microns, between about 10 microns and about 200 microns, between about 10 microns and about 500 microns, between about 10 microns and about 750 microns, or between about 10 microns and about 1000 microns. In other embodiments, the particle size is between about between about 100 microns and about 1000 microns, between about 100 microns and about 750 microns, between about 100 microns and about 500 microns, or between about 100 microns and about 250 microns.

In certain embodiments of the invention, the concentration of solid matter in the slurry may be above about 50% w/v. Alternatively, the concentration of solid matter may be less than about 50%, less than about 40%, less than about 30%, less than about 20%, less than about 10%, or less than about 5% w/v. In some embodiments, the concentration of solid matter is between about 2% and about 30%, between about 2% and about 20%, between about 2% and about 10%, between about 5% and about 10%, between about 5% and about 20%, or between about 1% and about 10% w/v.

In some embodiments, organic matter used in the methods of the invention is lignocellulosic matter subjected to an optional pre-treatment step in which hemicellulose is extracted. Accordingly, the majority of the hemicellulose (or indeed all of the hemicellulose) may be extracted from the lignocellulosic matter and the remaining material (containing predominantly cellulose and lignin) used to produce a biofuel by the methods of the invention. However, it will be understood that this pre-treatment is optional and no requirement exists to separate hemicellulose from lignocellulosic matter when performing the methods of the invention. Suitable methods for the separation of hemicellulose from lignocellulosic matter are described, for example, in PCT publication number WO/2010/034055 entitled "Fractionation of Lignocellulosic Matter", the entire contents of which are incorporated herein by reference.

For example, the hemicellulose may be extracted from lignocellulosic matter by subjecting a slurry comprising the lignocellulosic matter (e.g. 5%-15% w/v solid concentration) to treatment with a mild aqueous acid (e.g. pH 6.5-6.9) at a temperature of between about 100° C. and about 250° C., a reaction pressure of between about 2 bar and about 50 bar, for between about 5 and about 20 minutes. The solubilised hemicellulose component may be separated from the remaining solid matter (containing predominantly cellulose and lignin) using any suitable means (e.g. by use of an appropriately sized filter). The remaining solid matter may be used directly in the methods of the invention, or alternatively mixed with one or more other forms of organic matter (e.g. lignite) for use in the methods of the invention.

Biofuel Production

The methods of the invention provide a means of generating a biofuel from organic matter. Using the methods of the invention, feedstock material (e.g. in the form of a slurry) is initially contacted with supercritical aqueous solvent. The aqueous solvent is in a supercritical state prior to contact with the organic matter.

In preferred embodiments, contact of the supercritical solvent with the organic matter causes a phase change in the solvent (i.e. brings it into a subcritical state).

In alternative embodiments, contact of the supercritical solvent with the organic matter may not cause a supercritical to subcritical phase change in the solvent (i.e. the solvent remains in a supercritical state) such as, for example, when the organic matter is provided for contact at a temperature and pressure close to or above the critical point of solvent. Additionally or alternatively, the temperature and/or pressure of the supercritical solvent may be sufficiently above its critical point to maintain a supercritical state upon contact with the organic matter.

The resulting reaction mixture formed upon contact of the organic matter and solvent is maintained under target temperature(s) and pressure(s) for a time period (i.e. a "retention time") sufficient to produce a biofuel product. Additional catalysts may optionally be included in the reaction mixture to enhance the efficiency of biofuel production.

By way of non-limiting example only, organic matter may be provided in the form of a slurry (e.g. solid matter mixed with water) at a temperature and/or pressure below the critical point of the aqueous solvent to be employed (e.g. ambient temperature or less than about 300° C.). The slurry may be contacted with supercritical aqueous solvent (e.g. supercritical steam) triggering a phase change as the temperature and/or pressure of the solvent falls below its critical point. The reaction mixture of slurry/solvent may then be maintained under specific conditions of pressure and temperature (e.g. subcritical conditions) for a defined time period to form a biofuel before cooling and de-pressurisation.

Additional catalysts may optionally be utilised in the methods of the invention (see subsection below entitled "Catalysts"). The additional catalysts may be included to maintain a reducing environment favouring decomposition of the substrate material, the reduction of oxygen, and/or the incorporation of hydrogen. The additional catalysts may be added, for example, to the aqueous solvent prior to contacting the organic matter, to the slurry prior to contacting the aqueous solvent, and/or to the reaction mixture of organic matter and solvent.

The methods of the invention may be performed under conditions of continuous flow. For example, heating/pressurisation, contact of the organic matter with the solvent, maintenance of the resulting reaction mixture at target temperature(s)/pressure(s), and cooling/depressurisation may be performed while the organic material and solvent are each maintained in a continuously moving stream along the length of a given surface (e.g. the walls of a reactor vessel). Performing the methods of the invention under conditions of continuous flow may assist in achieving desired rates of mass and heat transfer, heating/cooling and/or pressurisation/de-pressurisation. Continuous flow may also allow the retention time to be tightly controlled and/or enhance reactions responsible for conversion of organic matter to biofuel by virtue of generating mixing and shear forces believed to aid in emulsification.

Putative Reaction Mechanisms

Without limitation to particular mode of action, it is believed that the beneficial effects of the present invention arise at least partially from the significant amount of energy released when supercritical aqueous solvent is initially contacted with organic matter provided at a temperature and/or pressure below the critical point of the solvent. The contact is thought to facilitate a phase change in the supercritical solvent (i.e. bringing it into a subcritical state) which triggers a large release of energy. The energy released is believed to enhance decomposition of the feedstock material and/or assist in driving conversion of the matter into biofuel.

Again without limitation to particular mechanisms, organic matter used in the methods of the invention is thought to be decomposed (i.e. transformation of solid to liquid and gas) primarily by acid- and/or base-catalysed hydrolysis. The hydrolysis reactions may be mediated by aqueous cations (hydronium) and anions (hydroxide) dissociated from water molecules under increased temperature and pressure (e.g. water molecules derived from the supercritical aqueous solvent). Hydrolysis of the organic substrate may also be enhanced by the inclusion of additional acid and/or base catalysts in the reaction mixture of organic matter and solvent. Exemplary reactions that may be involved in hydrolysis of the organic material include the conversion of glycosidic and/or ether linkages of the organic matter into alcohols, and the conversion of esters of the organic matter to carboxylic acids and alcohols.

In certain embodiments, aqueous solvents used in the methods of the invention are aqueous alcohols. It is postulated that under increased temperature and pressure alcohols present in the solvent may decompose solid organic matter by alcoholysis. Additional roles of alcohols (if present) in the aqueous solvent may include swelling of the organic matter to induce greater reactivity, and/or the removal of hydrolysed species from the surface of the matter to expose fresh surface that can hydrolyse further (thereby increasing overall yield). Alcohols in the aqueous solvent may also act as radical modifiers reducing the occurrence and/or severity of undesirable radical side reactions (e.g. polymerisations).

It is also postulated that the conversion of organic matter into biofuel by the methods of the invention involves removal of oxygen from the matter. Again without being bound to particular mechanistic pathways, it is believed that the inclusion of specific catalysts in the reaction mixture and/or thermal catalysis of the matter facilitates one or more of: elimination (dehydration) reactions (i.e. elimination of water to give double bonds), decarboxylation reactions (i.e. removal of carboxyl group(s) from compounds of the organic matter as carbon dioxide), and decarbonylation reactions (i.e. removal of carbon monoxide from aldehydes), each of which may assist in removing oxygen from compounds present in the organic matter under treatment.

Additionally, hydrogenation of compounds in the organic matter is also a postulated mechanism contributing to conversion of the organic matter to biofuel. Hydrogenation may be facilitated by specific catalysts added to the reaction mixture of solvent and organic matter. Without limitation to particular mechanisms, the catalysts are proposed to enhance:

(i) transfer hydrogenation of aldehydes, ketones and/or unsaturated or aromatic systems in compounds of the organic matter to yield alcohols (from which oxygen can then be removed by dehydration, i.e. the elimination of water) and saturated moities; and/or (ii) direct hydrogenation of aldehydes, ketones and/or unsaturated or aromatic systems to yield alcohols (which can then be eliminated by removal of oxygen) and saturated moities.

The hydrogenation and subsequent dehydration may occur in a cascade reaction system (referred to as hydrodeoxygenation).

It is believed that hydrogen in the system may be made available by gasification of the organic matter (and alcohols in the aqueous solvent if present), yielding a mixture of hydrogen, carbon monoxide and water, the latter two may then undergo the water-gas-shift reaction to form molecular hydrogen and carbon dioxide. In addition, carbon monoxide arising from gasification is thought to interact with specific catalysts (e.g. sodium hydroxide or potassium hydroxide) that may be added to the reaction mixture to form a formate (e.g. sodium formate or potassium formate). The formate so formed may act as a hydrogen transfer agent to facilitate the hydrogenation of compounds in the organic material. Other hydrogen transfer agents that might be generated via the decomposition of organic matter are low molecular weight acids, especially formic, acetic and oxalic acid.

Overall and again without limitation to particular modes of action, it is thought that partial gasification of reactive species in the presence of the catalysts described herein drives a cascade of interrelated reactions culminating in the generation of biofuel with high energy and stability.

In general, it is thought that the stability (and high energy content) of biofuels produced by the methods of the invention arise, at least in part, from the relatively low oxygen and high hydrogen content which reduces the degree of unsaturation (a starting point for undesired polymerisation leading to 'gumming up' of the material). In addition, it is considered that unsaturated or aromatic bonds present in the product may be less likely to be activated by neighbouring oxygen groups further reducing re-polymerisation potential.

Aqueous Alcohols and Solvents

In accordance with the methods of the invention, organic matter may be contacted with a supercritical aqueous solvent to form a reaction mixture. A reaction mixture in accordance with the invention may comprise one or more alcohol(s).

The alcohol(s) may act as alkylating agent(s). Without limitation to particular mechanism(s) the transfer of an alkyl group from the aqueous alcohol to one or more components of the organic matter is thought to facilitate solvation and/or chemical stabilisation of the organic matter.

Suitable alcohols may comprise between one and about ten carbon atoms. Non-limiting examples of suitable alcohols include methanol, ethanol, isopropyl alcohol, isobutyl alcohol, pentyl alcohol, hexanol and iso-hexanol.

In certain embodiments, a reaction mixture in accordance with the invention comprises a mixture of two or more alcohols.

Preferably, a reaction mixture in accordance with the invention comprises ethanol, methanol, or a mixture thereof.

In certain embodiments, the alcohol(s) may be mixed with the organic matter prior to contact with the supercritical aqueous solvent. For example, the alcohol(s) may be mixed into a slurry comprising the organic matter at any time prior to contacting the supercritical aqueous solvent.

The slurry may comprise any proportion of alcohol. For example, the slurry may comprise more than about 5%, 10%, 15%, 20%, 25%, 30%, 35%, 40%, 45% or 50% alcohol by weight. Alternatively, the slurry may comprise less than about 5%, 10%, 15%, 20%, 25%, 30%, 35%, 40%, 45% or 50% alcohol by weight Additionally or alternatively, the alcohol(s) may be mixed into the aqueous solvent (e.g. before and/or after becoming supercritical).

Additionally or alternatively, the alcohol(s) may be mixed into the reaction mixture as it forms upon contact of the organic matter and supercritical aqueous solvent.

Additionally or alternatively, the alcohol(s) may be mixed into the reaction mixture at any time after organic matter has contacted the supercritical aqueous solvent.

The reaction mixture may comprise between 0% and 100% by weight alcohol relative to total water in the mixture. For example, the reaction mixture may comprise between about 0% and about 20% alcohol by weight relative to total water (i.e. alcohol:water ratio in reaction mixture of between about 0:10 and about 2:8). Alternatively, the reaction mixture may comprise between about 80% and about 100% alcohol by weight relative to total water (i.e. alcohol:water ratio in reaction mixture of between about 8:2 and about 10:0).

In certain embodiments, the reaction mixture comprises more than about 5%, 10%, 15%, 20%, 25%, 30%, 35%, 40%, 45% or 50% alcohol by weight relative to total water. In other embodiments the reaction mixture comprises less than about 5%, 10%, 15%, 20%, 25%, 30%, 35%, 40%, 45% or 50% alcohol by weight relative to total water.

Typically, alcohol(s) incorporated into the organic matter (e.g. slurry), and/or reaction mixture may comprise at least one percent alcohol based on total weight of the organic matter or reaction mixture (as appropriate). In certain embodiments, the aqueous alcohol comprises more than about 5%, 10%, 15%, 20%, 25%, 30%, 35%, 40%, 45% or 50% alcohol by weight. In other embodiments, the aqueous alcohol comprises less than about 5%, 10%, 15%, 20%, 25%, 30%, 35%, 40%, 45% or 50% alcohol by weight.

The specific type of supercritical aqueous solvent used in the methods of the invention may vary depending on the form of organic matter utilised.

In certain embodiments, the supercritical solvent may be water (i.e. steam under supercritical conditions). For example, it may be suitable or preferable to use water as the supercritical aqueous solvent when the organic matter used in the methods consists of or comprises a significant amount of fossilised organic matter (e.g. lignite, peat and the like).

In other embodiments, the supercritical solvent is an aqueous alcohol. For example, it may be suitable or preferable to use an aqueous alcohol as the solvent when the organic matter used in the methods consists of or comprises a significant amount of lignocellulosic material and/or other materials such rubber and plastics due to the stronger chemical bonds in these types of organic matter.

The aqueous alcohol will generally comprise at least one percent alcohol based on total weight of solvent. In certain embodiments, the aqueous alcohol comprises more than about 5%, 10%, 15%, 20%, 25%, 30%, 35%, 40%, 45% or 50% alcohol by weight. In other embodiments, the aqueous alcohol comprises less than about 5%, 10%, 15%, 20%, 25%, 30%, 35%, 40%, 45% or 50% alcohol by weight.

Preferably, the aqueous alcohol comprises between about 1% and about 50% alcohol by weight, about between 5% and about 50% alcohol by weight, between about 5% and about 40% alcohol by weight, between about 5% and about 30% alcohol by weight, between about 5% and about 20% alcohol by weight, between about 5% and about 10% alcohol by weight, between about 10% and about 50% alcohol by weight, between about 20% and about 50% alcohol by weight, between about 25% and about 50% alcohol by weight, or between about 30% and about 50% alcohol by weight.

In preferred embodiments, a supercritical aqueous solvent used in the methods of the invention is aqueous methanol, aqueous ethanol, or a mixture thereof.

In particularly preferred embodiments, the supercritical aqueous solvent is aqueous ethanol. Preferably, the aqueous ethanol comprises between about 5% and about 30% ethanol by weight, more preferably between about 10% and about 25% ethanol by weight, and still more preferably between about 15% and about 25% ethanol by weight.

Reaction Temperatures and Pressures

In accordance with the methods of the invention, organic matter may be contacted with a supercritical aqueous solvent.

Preferably, the organic matter is provided in the form of a slurry for contact with the solvent.

In general, the organic matter may be provided for contact at a temperature and/or pressure below the critical point of the solvent with which it is contacted. Preferably, the temperature and/or pressure of the organic matter is/are sufficiently below the critical point of the solvent to initiate a rapid phase change (supercritical to subcritical) in the solvent upon contacting it.

In some embodiments, the organic matter may be provided for contact with the supercritical solvent at a pressure equal to or above the critical pressure of the solvent and at a temperature less than the critical temperature of the solvent.

In other embodiments, the organic matter may be provided at a temperature equal to or above the critical temperature of the solvent and at a pressure less than the critical pressure of the solvent.

In other embodiments, the organic matter may be provided at a temperature and pressure below the critical temperature and critical pressure (respectively) of the aqueous solvent.

In certain embodiments, the temperature of the organic matter may be at least about 5° C., 10° C., 15° C., 20° C., 30° C., 40° C., 50° C., 60° C., 70° C., 80° C., 90° C., 100° C., 125° C., 150° C., 175° C., 200° C., 225° C., 250° C., 275° C., 300° C., 325° C., or 350° C. less than the critical temperature of the aqueous solvent.

Additionally or alternatively, the organic matter may be at a pressure of at least about 5 bar, 10 bar, 15 bar, 20 bar, 30 bar, 40 bar, 50 bar, 60 bar, 70 bar, 80 bar, 90 bar, 100 bar, 125 bar, 150 bar, 175 bar, or 200 bar less than the critical pressure of the aqueous solvent.

For example, the organic matter may be provided at a temperature of between about 10° C. and about 30° C. (e.g. about 20° C.) and a pressure of between about 220 bar and about 280 bar (e.g. about 240 bar or about 260 bar). Alternatively, the organic matter may be provided at a temperature of between about 150° C. and about 320° C.

(e.g. about 300° C.) and a pressure of between about 220 bar and 280 bar (e.g. about 240 bar or about 260 bar).

In certain embodiments, the organic matter is provided for contact with the supercritical solvent at a pressure above the critical pressure of the solvent (e.g. about 10, 20, 30, 40, 50, 75 or 100 bar above the critical pressure of the solvent) and a temperature below the critical temperature of the solvent (e.g. about 5° C., 10° C., 15° C., 20° C., 30° C., 40° C., 50° C., 60° C., 70° C., 80° C., 90° C., 100° C., 125° C., 150° C., 175° C., 200° C., 225° C., 250° C., 275° C., 300° C., 325° C., or 350° C. less than the critical temperature of the aqueous solvent.

Persons skilled in the art will recognise that the critical temperature and critical pressure of a given aqueous solvent will depend, at least in part, on the percentage of water in the solvent. For example, if an aqueous solvent comprises a given percentage of water in combination with a given percentage of a second component having a lower critical point than water (e.g. an alcohol), the critical point of the solvent will generally be lower than that of pure water. Conversely, if an aqueous solvent comprises a given percentage of water in combination with a given percentage of a second component having a higher critical point than water, the critical point of the solvent will generally be higher than that of pure water.

In cases where an aqueous solvent comprises two core components (e.g. water and an alcohol), an approximately linear relationship may exist between the percentage of the alcohol present in the solvent and the critical temperature and pressure of the solvent, the end points being defined at one end by the critical point of pure water and at the other end by the critical point of the pure alcohol. For example, if the critical point of water is defined as 374° C. and 220 bar and the critical point of ethanol is defined as 240° C. and 61 bar, the critical point of a 25% aqueous ethanol solution may be approximately 340° C./180 bar, the critical point of a 50% aqueous ethanol solution may be approximately 307° C./140 bar, and the critical point of a 75% aqueous ethanol solution may be approximately 273° C./100 bar.

In cases where an aqueous solvent comprises more than two core components (e.g. water and two different types of alcohol), calculations of a similar nature may be used to determine the critical point of the solvent when the proportions of the various alcohols in the solvent are varied.

Accordingly, it will be understood that when a temperature and/or pressure (or a range of temperatures and/or pressures) is provided herein in relation to a given aqueous solvent comprising two or more core components in specified proportions (e.g. a 10% w/v aqueous alcohol), corresponding values/ranges of temperature and/or pressure may readily be derived when the relative proportions of the core components are varied.

In some embodiments, the supercritical aqueous solvent may be provided at a temperature of between about 300° C. and about 600° C. (e.g. about 400° C. or about 450° C.) and a pressure of between about 100 bar and about 350 bar (e.g. about 220 bar or about 240 bar). In other embodiments, the supercritical aqueous solvent may be provided at a temperature of between about 350° C. and about 500° C. and a pressure of between about 200 bar and 250 bar.

In alternative embodiments, contact of the supercritical solvent with the organic matter may not cause a supercritical to subcritical phase change in the solvent (i.e. the solvent remains in a supercritical state). For example, the organic matter may be provided for contact at a temperature and pressure close to or above the critical point of solvent precluding a phase change in the solvent upon contact with the organic matter.

Additionally or alternatively, the temperature and/or pressure of the supercritical solvent may be sufficiently above its critical point to maintain a supercritical state upon contact with the organic matter.

Following contact of the organic matter with a supercritical solvent, the resulting reaction mixture may be treated at target temperature(s) and/or pressure(s) suitable for conversion of the matter into biofuel.

For example, the reaction mixture may be treated at temperature(s) below the critical temperature of the mixture and/or pressure(s) below the critical pressure of the mixture (i.e. a 'subcritical' reaction mixture).

In some embodiments, the 'subcritical' reaction mixture may be treated at a temperature and/or pressure approaching the 'critical point' of the mixture (e.g. between about 10° C. and about 50° C. below its critical temperature and/or between about 10 bar and about 50 bar below its critical pressure).

In other embodiments, the 'subcritical' reaction mixture may be treated at a temperature below the critical temperature of the mixture (e.g. between about 10° C. and about 50° C. below its critical temperature) and a pressure above the supercritical pressure of the mixture (e.g. between about 10 bar and about 50 bar above its critical pressure).

In certain embodiments the 'subcritical' reaction mixture may be treated at a temperature above the critical temperature of the mixture (e.g. between about 10° C. and about 50° C. above its critical temperature) and a pressure below the supercritical pressure of the mixture (e.g. between about 10 bar and about 50 bar below its critical pressure).

In some embodiments, the reaction mixture is treated at temperature(s) and pressure(s) above the critical point of the mixture (i.e. a 'supercritical' reaction mixture).

In other embodiments, the reaction mixture is treated at variable temperatures and/or pressures oscillating both above and below the critical point of the mixture. Accordingly, the reaction mixture may be treated in a manner causing it to oscillate between 'subcritical' and 'supercritical' states.

In addition to the specific properties and characteristics of the organic matter and aqueous solvent used, the skilled addressee will recognise that the critical point of a given mixture of organic matter and aqueous solvent will be influenced by number of factors including the chemical state of the organic matter under treatment. For example, the critical point of a given reaction mixture is likely to change over the course of a treatment as feedstock material becomes solvated.

In certain embodiments, a reaction mixture of organic matter and aqueous solvent treated in accordance with the methods of the invention may be treated at temperature(s) of between about 200° C. and about 450° C. and pressure(s) of between about 50 bar and about 350 bar. In other embodiments, the mixture may be treated at temperature(s) of between about 250° C. and about 400° C. and pressure(s) of between about 100 bar and about 300 bar. In additional embodiments, the mixture may be treated at temperature(s) of between about 275° C. and about 375° C. and pressure(s) of between about 150 bar and about 275 bar. In some preferred embodiments, the mixture may be treated at temperature(s) of between about 300° C. and about 375° C. and pressure(s) of between about 175 bar and about 275 bar. In other preferred embodiments, the mixture may be treated at temperature(s) of between about 330° C. and about 360° C.

and pressure(s) of between about 200 bar and about 250 bar. In still other preferred embodiments, the mixture may be treated at temperature(s) of between about 340° C. and about 360° C. and pressure(s) of between about 200 bar and about 250 bar.

The skilled addressee will understand that a generally inverse relationship may exist between the temperature and/or pressure required to drive conversion of organic material into biofuel using the methods of the invention, and the proportion of additional component(s) (e.g. alcohol) combined with water in the aqueous solvent. For example, the use of an aqueous solvent comprising substantially water (i.e. in the absence of additional component(s) such as alcohol) may require increased temperature and/or pressure to drive conversion of the organic matter into biofuel compared to the use of an aqueous solvent comprising a more substantial proportion of alcohol (which may require comparatively less temperature and/or pressure to drive the conversion). Accordingly, it would be readily apparent to the skilled addressee that increasing the proportion of, for example, alcohol (e.g. ethanol and/or methanol) in an aqueous solvent may allow a corresponding decrease in the temperature and/or pressure required to achieve efficient conversion of organic matter to biofuel using the methods of the invention. Conversely, it would be readily apparent that decreasing the proportion of, for example, alcohol (e.g. ethanol and/or methanol) in an aqueous solvent may require a corresponding increase in the temperature and/or pressure required to achieve efficient conversion of organic matter to biofuel using the methods of the invention.

It will also be recognised that various additional catalysts as described herein (see sub-section below entitled "Catalysts") may be used to increase the efficiency of the treatment which may in turn reduce the temperature and/or pressure required to drive conversion of the organic matter into biofuel.

The specific conditions of temperature and pressure used when practicing the methods of the invention may depend on a number different factors including, for example, the type of aqueous solvent used, the percentage of alcohol (if present) in the aqueous solvent, the type of organic matter under treatment, the physical form of the organic matter under treatment, the types of catalyst(s) utilised (if present) and their various concentration(s), the retention time, and/or the type of apparatus in which the methods are performed. These and other factors may be varied in order to optimise a given set of conditions so as to maximise the yield and/or reduce the processing time. In preferred embodiments, all or substantially all of the organic material used as a feedstock is converted into biofuel.

Desired reaction conditions may be achieved, for example, by conducting the reaction in a suitable apparatus capable of maintaining increased temperature and increased pressure (e.g. see section below entitled "Apparatus for biofuel production").

Retention Time

In accordance with the methods of the invention, organic matter may be contacted with a supercritical aqueous solvent. The aqueous solvent is in a supercritical state prior to contact with the organic matter.

The resulting reaction mixture of organic matter and solvent may then be treated at target temperature(s) and pressure(s) for a time period ("retention time") sufficient to covert the organic matter into biofuel. Preferably, the retention time is sufficient to convert all, or substantially all, of the organic matter into biofuel.

The length of the retention time may depend on a number different factors including, for example, the type of aqueous solvent used, the percentage of alcohol (if present) in the aqueous solvent, the type of organic matter under treatment, the physical form of the organic matter under treatment, the types of additional catalyst(s) (if present) in the mixture and their various concentration(s), and/or the type of apparatus in which the methods are performed. These and other factors may be varied in order to optimise a given method so as to maximise the yield and/or reduce the processing time. Preferably, the retention time is sufficient to covert all or substantially all of the organic material used as a feedstock into biofuel.

In certain embodiments, the retention time is less than about 60 minutes, 45 minutes, 30 minutes, 25 minutes, 20 minutes, 15 minutes, 10 minutes or 5 minutes. In certain embodiments, the retention time is more than about 60 minutes, 45 minutes, 30 minutes, 25 minutes, 20 minutes, 15 minutes, 10 minutes or 5 minutes. In other embodiments, the retention time is between about 1 minute and about 60 minutes. In additional embodiments, the retention time is between about 5 minutes and about 45 minutes, between about 5 minutes and about 35 minutes, between about 10 minutes and about 35 minutes, or between about 15 minutes and about 30 minutes. In further embodiments, the retention time is between about 20 minutes and about 30 minutes.

Persons skilled in the art will recognised that various additional catalysts as described herein (see sub-section below entitled "Catalysts") may be used to increase the efficiency of the treatment which may in turn reduce the retention time required to convert the organic matter into biofuel. Similarly, the retention time required may in some cases be less where the temperature and/or pressure is increased, and/or the proportion of additional component(s) (e.g. alcohol) in the aqueous solvent is increased.

The optimal retention time for a given set of reaction conditions as described herein may be readily determined by the skilled addressee by preparing and running a series of reactions that differ only by the retention time, and analysing the yield and/or quality of biofuel produced.

Cooling and De-Pressurisation

Following completion of the retention time period the reaction mixture may be cooled to between about 150° C. and about 200° C., between about 160° C. and about 200° C., preferably between about 170° C. and about 190° C., and more preferably about 180° C., in a time period of less than about 10 minutes, preferably less than about 7 minutes, more preferably less than about 6 minutes, preferably between about 4 and about 6 minutes, and more preferably about 5 minutes. Following the initial cooling period, the temperature may further reduced to ambient temperature with concurrent de-pressurisation by fast release into a cool aqueous medium (e.g. cooled water).

The processes of cooling/de-pressurisation may be facilitated by performing the methods of the invention in a continuous flow system (see section below entitled "Continuous flow"). In particular, cooling/de-pressurisation may be facilitated using a pressure let down device such as that described in Australian provisional patent application No. 2009904499 entitled "An assembly for reducing slurry pressure in a slurry processing system", the entire contents of which are incorporated herein by reference.

Catalysts

In accordance with the methods of the invention, organic matter may be contacted with a supercritical aqueous solvent. The aqueous solvent is in a supercritical state prior to contact with the organic matter.

The resulting reaction mixture of organic matter and solvent may then be treated at target temperature(s) and pressure(s) for a time period ("retention time") sufficient to convert organic matter into biofuel. The reaction mixture may then be cooled and depressurised.

Generation of biofuel from organic matter using the methods of the invention may be enhanced by the inclusion of one or more "additional catalysts". Although some catalysts may be an intrinsic component of the organic matter (e.g. minerals), aqueous solvent (e.g. hydronium/hydroxide ions of water under sub/supercritical conditions), and/or vessel walls of a reactor, apparatus in which the organic matter may be treated (e.g. transition/noble metals), the invention contemplates the use of "additional catalysts" to enhance the production of biofuel from organic material.

(i) "Additional" Catalysts

Certain embodiments of the invention relate to the production of biofuel from organic matter by contacting organic matter with supercritical aqueous solvent (brought into a supercritical state prior to contacting the organic matter) and treating the resulting reaction mixture at target temperature(s) and pressure(s) for a time period ("retention time") in the presence of at least one "additional" catalyst. By "additional catalyst" it will be understood that the catalyst is supplementary (i.e. separate) to catalytic compounds intrinsically present in other reaction components such as the organic matter, aqueous solvent and/or walls of a reactor apparatus. In other words, an "additional" catalyst as contemplated herein may be considered to be an "extrinsic" catalyst in the sense that it is provided to the reaction as an individual reaction component.

For example, an embodiment of the invention in which lignite feedstock is contacted with supercritical steam (only) and the resulting reaction mixture treated at target temperature(s) and pressure(s) in a reactor apparatus would not be considered to utilise an "additional catalyst".

In contrast, an embodiment of the invention in which lignite feedstock is contacted with supercritical steam and the reaction mixture treated at target temperature(s) and pressure(s) in the presence of a supplementary base catalyst (e.g. sodium hydroxide) in a reactor apparatus would be considered to utilise an "additional catalyst".

An additional catalyst as contemplated herein may be any catalyst that enhances the formation of biofuel from organic matter using the methods of the invention, non-limiting examples of which include base catalysts, acid catalysts, alkali metal hydroxide catalysts, transition metal hydroxide catalysts, alkali metal formate catalysts, transition metal formate catalysts, reactive carboxylic acid catalysts, transition metal catalysts, sulphide catalysts, noble metal catalysts, water-gas-shift catalysts, and combinations thereof.

Methods of the invention may be performed using "additional" catalyst(s) in combination with "intrinsic" catalyst(s).

The optimal quantity of an additional catalyst used in the methods of the invention may depend on a variety of different factors including, for example, the type of organic matter under treatment, the volume of organic matter under treatment, the aqueous solvent utilised, the specific temperature and pressure employed during the reaction, the type of catalyst and the desired properties of the biofuel product. By following the methods of the invention, the optimal quantity of an additional catalyst to be used can be determined by one skilled in the art without inventive effort.

In certain embodiments, an additional catalyst or combination of additional catalysts may be used in an amount of between about 0.1% and about 10% w/v catalysts, between about 0.1% and about 7.5% w/v catalysts, between about 0.1% and about 5% w/v catalysts, between about 0.1% and about 2.5% w/v catalysts, between about 0.1% and about 1% w/v catalysts, or between about 0.1% and about 0.5% w/v catalysts (in relation to the aqueous solvent).

In certain embodiments, an "additional" catalyst used in the reaction process may be an alkali and/or alkaline earth metal salt (e.g. potassium, calcium and/or sodium salts). For example, it has been demonstrated herein that alkali metal hydroxides and carbonates may be effective in reducing the oxygen content of the bio-oil product where all conditions except additional catalyst concentration are constant. In one embodiment, the optimum catalyst concentration (in the reaction itself) of an alkali metal hydroxide and/or alkali metal carbonate catalyst under a given set of otherwise substantially constant reaction conditions may be in the range of about 0.1 Molar to about 1 Molar. In preferred embodiments, the concentration may be about 0.1 Molar to about 0.3 Molar. Preferably, the concentration of alkali metal hydroxide and/or alkali metal carbonate catalyst used provides a product with a low oxygen content (e.g. less than about 11% w/w; between about 6% and about 11% w/w).

In general, the additional catalysts may be used to create or assist in forming and/or maintaining a reducing environment favouring the conversion of organic matter to biofuel. The reducing environment may favour hydrolysis of the organic matter, drive the replacement of oxygen with hydrogen, and/or stabilise the biofuel formed.

Treatment of the reaction mixture (comprising organic matter and aqueous solvent) under subcritical conditions may be advantageous in that less energy is required to perform the methods and the solvent may be better preserved during treatment. When subcritical conditions are utilised it is contemplated that the use of one or more additional catalysts may be particularly beneficial in increasing the yield and/or quality of the biofuel. Further, the cost benefits of reduced input energy (i.e. to maintain subcritical rather than supercritical conditions) and preservation of the solvent may significantly outweigh the extra cost incurred by additionally including one or more of the catalysts described herein.

It is contemplated that under conditions of increased temperature and pressure water molecules in the aqueous solvent may dissociate into acidic (hydronium) and basic (hydroxide) ions facilitating hydrolysis of solid matter under treatment (i.e. solid to liquid transformation). In certain embodiments, the temperature and pressure at which the reaction mixture is treated may be sufficiently high for desired levels of hydrolysis to occur without the use of additional catalysts. Additionally or alternatively, the specific organic material used may be relatively easy to hydrolyse (and additional catalysts therefore not required). For example, sufficient hydrolysis of fossilised organic matter such as lignite may be achieved by contacting with supercritical water and treating the resulting reaction mixture without using the additional catalysts described herein. However, the inclusion of such additional catalysts may be used as a means to increase the yield and/or quality of biofuel produced.

In other cases, the temperature and pressure at which the reaction mixture is treated may not be sufficiently high for desired levels of hydrolysis to occur without using additional catalysts. Additionally or alternatively, the specific organic material used may be difficult to hydrolyse due to its specific chemical structure (e.g. lignocellulosic matter).

Accordingly, additional hydrolysis catalysts may be added to enhance (i.e. increase and/or accelerate) hydrolysis of solid matter under treatment (i.e. hydrolysis catalysts).

In certain embodiments, the additional hydrolysis catalysts may be base catalysts. Any suitable base catalyst may be used.

Non-limiting examples of suitable base catalysts for hydrolysis include alkali metal salts, transition metal salts, organic bases, and mixtures thereof.

The alkali metal salts or transition metal salts may comprise any inorganic anion(s), non-limiting examples of which include sulfate, sulfite, sulfide, disulfide, phosphate, aluminate, nitrate, nitrite, silicate, hydroxide, methoxide, ethoxide, alkoxide, carbonate and oxide. Preferred alkali metal or transition metal salts are sodium, potassium, iron, calcium and barium salts, and may comprise one or more anions selected from phosphate, aluminate, silicate, hydroxide, methoxide, ethoxide, carbonate, sulphate, sulphide, disulphide and oxide.

Non-limiting examples of suitable organic bases include ammonia, basic and polar amino-acids (e.g. lysine, histidine, arginine), benzathin, benzimidazole, betaine, cinchonidine, cinchonine, diethylamine, diisopropylethylamine, ethanolamine, ethylenediamine, imidazole, methyl amine, N-methyl guanidine, N-methylmorpholine, N-methylpiperidine, phosphazene bases, picoline, piperazine, procain, pyridine, quinidine, quinoline, trialkylamine, tributylamine, triethyl amine, trimethylamine and mixtures thereof.

In certain embodiments, the additional hydrolysis catalysts may be acid catalysts although it will be recognised that acid catalysts may generally slower in catalysing hydrolysis of the organic matter than base catalysts. Any suitable acid catalyst may be used.

Non-limiting examples of suitable acid catalysts for hydrolysis include liquid mineral acids, organic acids, and mixtures thereof. The liquid mineral acids and organic acids may comprise any inorganic anion(s), non-limiting examples of which include aluminate, sulfate, sulfite, sulfide, phosphate, phosphite, nitrate, nitrite, silicate, hydroxide and alkoxide (under supercritical or near supercritical conditions), carbonate and carboxy group anions.

Non-limiting examples of suitable organic acids include acetic acid, butyric acid, caproic acid, citric acid, formic acid, glycolic acid, 3-hydroxypropionic acid, lactic acid, oxalic acid propionic acid, succinic acid, uric acid, and mixtures thereof.

In certain embodiments, the acid catalyst(s) for hydrolysis may be present in minerals of the organic matter and/or derived from the in situ formation of carboxylic acids and/or phenolics during the treatment process. It will be understood that these are not "additional catalysts" as contemplated herein.

In certain embodiments of the invention, a mixture of one or more additional acid hydrolysis catalysts and one or more additional base hydrolysis catalysts may be used to enhance hydrolysis of solid matter under treatment.

The methods of the invention may employ additional catalysts for hydrolysis of the organic matter (as discussed in the preceding paragraphs). Additionally or alternatively, the methods may utilise additional catalysts that increase and/or accelerate the removal of oxygen (either directly or indirectly) from compounds in the organic matter under treatment. The removal of oxygen may provide a number of advantageous effects such as, for example, increasing the energy content and stability of the biofuel produced.

An additional acid catalyst may be used to enhance the removal of oxygen, for example, by dehydration (elimination) of water. Accordingly, in certain embodiments an additional acid catalyst may be used to enhance hydrolysis, and to enhance the removal of oxygen from organic matter under treatment.

Any suitable acid catalyst may be used to enhance oxygen removal. Non-limiting examples of suitable acid catalysts for oxygen removal include liquid mineral acids, organic acids, and mixtures thereof. The liquid mineral acids and organic acids may comprise any inorganic anion(s), non-limiting examples of which include aluminate, sulfate, sulfite, sulfide, phosphate, phosphite, nitrate, nitrite, silicate, hydroxide and alkoxide (under supercritical or near supercritical conditions), carbonate and carboxy group anions.

Non-limiting examples of suitable organic acids include acetic acid, butyric acid, caproic acid, citric acid, formic acid, glycolic acid, 3-hydroxypropionic acid, lactic acid, oxalic acid propionic acid, succinic acid, uric acid, and mixtures thereof.

In certain embodiments alumino-silicates including hydrated forms (e.g. zeolites) may be used during the treatment of organic matter to assist in dehydration (elimination) of water.

Additionally or alternatively, the removal of oxygen may be enhanced by thermal means involving decarbonylation of, e.g. aldehydes (giving $R_3C$—H and CO gas) and decarboxylation of carboxylic acids in the material under treatment (giving $R_3C$—$F_1$ and $CO_2$ gas). The speed of these reactions may be enhanced by the use of additional acid and/or transition (noble) metal catalysts. Any suitable transition or noble metal may be used including those supported on solid acids. Non-limiting examples include $Pt/Al_2O_3/SiO_2$, $Pd/Al_2O_3/SiO_2$, $Ni/Al_2O_3/SiO_2$, and mixtures thereof.

Additionally or alternatively, an additional combined acid and hydrogenation catalyst may be used to enhance the removal of oxygen, for example, by hydrodeoxygenation (i.e. elimination of water (via acid component) and saturation of double bonds (via metal component)). Any suitable combined acid and hydrogenation catalyst may be used including those supported on solid acids. Non-limiting examples include $Pt/Al_2O_3/SiO_2$, $Pd/Al_2O_3/SiO_2$, $Ni/Al_2O_3/SiO_2$, $NiO/MoO_3$, $CoO/MoO_3$, $NiO/WO_2$, zeolites loaded with noble metals (e.g. ZSM-5, Beta, ITQ-2), and mixtures thereof.

The methods of the invention may employ additional catalysts that enhance hydrolysis of the organic matter under treatment, and/or catalysts that enhance the removal of oxygen from compounds in the organic matter (as discussed in the preceding paragraphs). Additionally or alternatively, the methods may utilise additional catalysts that enhance the concentration of hydrogen (either directly or indirectly) into compounds of the organic matter under treatment. The concentration of hydrogen may provide a number of advantageous effects such as, for example, increasing the energy content and stability of the biofuel produced.

An additional transfer hydrogenation catalyst may be used to enhance the concentration of hydrogen into compounds of the organic matter under treatment, for example, by transfer hydrogenation or in situ hydrogen generation.

Any suitable transfer hydrogenation catalyst may be used to the concentration of hydrogen. Non-limiting examples of suitable transfer hydrogenation catalysts include alkali metal hydroxides (e.g. sodium hydroxide), transition metal hydroxides, alkali metal formates (e.g. sodium formate), transition metal formats, reactive carboxylic acids, transition or noble metals, and mixtures thereof.

The alkali metal hydroxide or formate may comprise any suitable alkali metal. Preferred alkali metals include sodium, potassium, and mixtures thereof. The transition metal hydroxide or formate may comprise any suitable transition metal, preferred examples including Fe and Ru. The reactive carboxylic acid may be any suitable carboxylic acid, preferred examples including formic acid, acetic acid, and mixtures thereof. The transition or noble metal may be any suitable transition or noble metal, preferred examples including platinum, palladium, nickel, ruthenium, rhodium, and mixtures thereof.

Additionally or alternatively, an additional transition metal catalyst may be used to enhance the concentration of hydrogen into organic matter under treatment, for example, by hydrogenation with $H_2$. Non-limiting examples of suitable transition metal catalysts for hydrogenation with $H_2$ include zero valent metals (e.g. platinum, palladium, and nickel), transition metal sulfides (e.g. iron sulfide (FeS, $Fe_xS_y$), and mixtures thereof.

Additionally or alternatively, an additional water gas shift catalyst may be used to enhance the concentration of hydrogen into organic matter under treatment (i.e. via a water-gas shift reaction). Any suitable water gas shift (WGS) catalyst may be used including, for example, transition metals, transition metal oxides, and mixtures thereof (e.g. magnetite, platinum-based WGS catalysts, finely divided copper and nickel).

Additionally or alternatively, the concentration of hydrogen into organic matter under treatment may be facilitated by in situ gasification (i.e. thermal catalysis). The in situ gasification may be enhanced by the addition transition metals. Any suitable transition metal may be used including, for example, those supported on solid acids (e.g. $Pt/Al_2O_3/SiO_2$, $Pd/Al_2O_3/SiO_2$, $Ni/Al_2O_3/SiO_2$, and mixtures thereof), and transition metal sulfides (e.g. $Fe_xS_y$, $FeS/Al_2O_3$, $FeS/SiO_2$, $FeS/Al_2O_3/SiO_2$, and mixtures thereof). Table 1 below provides a summary of various exemplary catalysts that may be employed in the methods of the invention and the corresponding reactions that they may catalyse.

TABLE 1 summary of additional catalysts and corresponding reactions

| Reaction Type | Catalyst Family | Catalyst Family Member | Specific example(s) | Preferred catalysts/ comments |
|---|---|---|---|---|
| Hydrolysis | Base catalysts | Sub/super-critical water | Hydroxide ion in sub/super-critical water | |
| | | All alkali and transition metal salts, both cations and anions can contribute. Include all common inorganic anions Any organic base | M = any alkali or transition metal A = anions, including: aluminate, sulfate, sulfite, sulfide phosphate, phosphite nitrate, nitrite silicate hydroxide alkoxide carbonate oxide ammonia, pyridine, etc. | M = Na, K, Fe, Ca, Ba A = aluminate, phosphate, silicate, hydroxide, methoxide, ethoxide carbonate sulphate sulphide disulphide ($FeS_2$) oxide |
| Hydrolysis | Acid catalysts (slower) | Sub/super-critical water | Hydronium ion in sub/super-critical water | |
| | | Any liquid mineral or organic acid | HA, where A = anions, including: aluminate, sulfate, sulfite, sulfide phosphate, phosphite nitrate, nitrite silicate hydroxide alkoxide carbonate carboxy group | Acids may form from the in-situ formation of carboxylic acids, phenolics and the presence of minerals |
| Dehydration (elimination) | Acid catalysts | Sub/super-critical water | Hydronium ion in sub/super-critical water | |
| | | Any liquid mineral or organic acid | HA, where A = anions, including: aluminate, sulfate, sulfite, sulfide phosphate, phosphite | Acids may form from the in-situ formation of carboxylic acids, phenolics and the presence of minerals. zeolites or |

TABLE 1-continued summary of additional catalysts and corresponding reactions

| Reaction Type | Catalyst Family | Catalyst Family Member | Specific example(s) | Preferred catalysts/ comments |
|---|---|---|---|---|
| | | | nitrate, nitrite silicate hydroxide alkoxide carbonate carboxy group | alumino-silicates in general may be added |
| Transfer Hydrogenation or in-situ $H_2$ generation | Transfer hydrogenation catalysts | All alkali and transition metal hydroxides and formates All reactive carboxylic acids All transition and noble metals | M = any alkali or transition metal A = hydroxide, formate All transition and noble metals | M = Na, K A = hydroxide, formate formic, acetic M = Pd, Pd, Ni Ru Rh |
| Decarboxylation | Largely thermal | Acid and transition (noble) metal cats have been reported to aid the process | All transition and noble metals supported on solid acids | $Pt/Al_2O_3/SiO_2$ $Pd/Al_2O_3/SiO_2$ $Ni/Al_2O_3/SiO_2$ |
| Decarbonylation | Largely thermal | As for decarboxylation | As for decarboxylation | As for decarboxylation |
| In-situ gasification | Largely thermal | Transition metals | supported transition metals sulfides | $Pt/Al_2O_3/SiO_2$ $Pd/Al_2O_3/SiO_2$ $Ni/Al_2O_3/SiO_2$ $Fe_xS_y$ $FeS/Al_2O_3$ $FeS/SiO_2$ $FeS/Al_2O_3/SiO_2$ |
| Water-Gas Shift | WGS catalysts | Standard WGS catalysts | As per literature | As per literature |
| Direct Hydrogenation with $H_2$ | Transition metals | Zero valent metals Sulfides | | Pt, P, Ni as zero valent FeS, $Fe_xS_y$ |
| Hydrode- oxygenation | Combined acid and hydrogenation catalyst | Transition metal and solid acid | M = transition metal A = acidic solid | $Pt/Al_2O_3/SiO_2$ $Pd/Al_2O_3/SiO_2$ $Ni/Al_2O_3/SiO_2$ $NiO/MoO_3$ $CoO/MoO_3$ $NiO/WO_2$ zeolites loaded with noble metals, e.g. ZSM-5, Beta, ITQ-2 |

Additional catalysts for use in the methods of the invention may be produced using chemical methods known in the art and/or purchased from commercial sources.

It will be understood that no particular limitation exists regarding the timing at which the additional catalyst(s) may be applied when performing the methods of the invention. For example, the additional catalyst(s) may be added to the organic matter, added to the aqueous solvent (e.g. before, during or after bringing to a supercritical state), and/or added to the reaction mix after contacting the organic matter with the supercritical aqueous solvent. The timing of additional catalyst application may depend on the reactivity of the feedstock utilised. For example, highly reactive feedstocks may benefit from additional catalysts mixed into the aqueous solvent prior to contact with the organic matter and/or addition to the reaction mixture of organic matter/solvent once generated. Additionally or alternatively, if organic matter to be contacted with supercritical solvent is pre-heated, additional catalysts may be mixed into the organic matter after completion of the pre-heating. In contrast, less reactive feedstocks may have a broader process window for the application of additional catalysts (i.e. the additional catalysts may be added to unheated organic matter prior to contacting with supercritical solvent).

(ii) "Intrinsic" Catalysts

Certain embodiments of the invention relate to the production of biofuel from organic matter by treatment with an aqueous solvent under conditions of increased temperature and pressure in the presence of at least one "additional" catalyst. As noted above, an "additional" catalyst will be understood to indicate that the catalyst is supplied supplementary to catalysts intrinsically present in other reaction component(s).

Additionally or alternatively, production of biofuel from organic matter in accordance with the methods of the invention may be enhanced by the presence of "intrinsic" catalyst(s) that are innately present in a given reaction component such as, for example, any one or more of organic matter feedstock, aqueous solvent, and/or vessel walls of a reactor apparatus in which the organic matter may be treated.

Accordingly, the methods of the invention may be performed using "additional" catalyst(s) in combination with "intrinsic" catalyst(s), or, "intrinsic" catalyst(s) alone.

The optimal quantity of an intrinsic catalyst used in the methods of the invention may depend on a variety of different factors including, for example, the type of organic matter under treatment, the volume of organic matter under treatment, the aqueous solvent utilised, the specific temperature and pressure employed during the reaction, the type of catalyst and the desired properties of the biofuel product.

In certain embodiments, an intrinsic catalyst or combination of intrinsic and additional catalyst may be used in an amount of between about 0.1% and about 10% w/v catalysts, between about 0.1% and about 7.5% w/v catalysts, between about 0.1% and about 5% w/v catalysts, between about 0.1% and about 2.5% w/v catalysts, between about 0.1% and about 1% w/v catalysts, or between about 0.1% and about 0.5% w/v catalysts (in relation to the aqueous solvent).

In certain embodiments, an "intrinsic" catalyst used in the reaction process may be an alkali and/or alkaline earth metal salt (e.g. potassium, calcium and/or sodium salts). For example, alkali metal hydroxides and carbonates may be effective in reducing the oxygen content of the bio-oil product. In one embodiment, the optimum catalyst concentration (in the reaction itself) of an alkali metal hydroxide and/or alkali metal carbonate catalyst under a given set of otherwise substantially constant reaction conditions may be in the range of about 0.1 Molar to about 1 Molar. In preferred embodiments, the concentration may be about 0.1 Molar to about 0.3 Molar. Preferably, the concentration of alkali metal hydroxide and/or alkali metal carbonate catalyst used provides a product with a low oxygen content (e.g. less than about 11% w/w; between about 6% and about 11% (w/w).

One or more different types of catalysts may be present in organic matter used as feedstock to the reaction. Non-limiting examples of these catalysts include minerals and/or alkali and/or alkaline earth metal salts. In certain embodiments, potassium and/or calcium salt present in organic matter feedstock may provide catalytic activity in the reaction.

For example, lignocellulosic biomass may comprise a variable amounts of ash (e.g. between 0.1% to about 50% ash), and the ash in turn may comprise various amounts of alkali salts (e.g. potassium salts and/or calcium salts) (see, for example, Stanislav et al., "*An Overview of the Chemical Composition of Biomass*", Fuel 89 (2010), 913-933). For example, the ash may comprise between about 0.2% to about 64% potassium (as potassium oxide) and/or between about 1% to about 83% calcium (as calcium oxide). Alkali salts present in the feedstock such as, for example, potassium and calcium salts may be catalysts for a range of reactions under the reaction conditions of the present invention including those reactions described in Table 1 above.

Additionally or alternatively, an aqueous solvent used in the methods of the invention may provide intrinsic catalysts to the reaction. Non-limiting examples of these catalysts include hydronium and/or hydroxide ions of water.

Additionally or alternatively, "intrinsic" catalysts may be provided by the vessel walls of a reactor apparatus in which the organic matter may be treated. Non-limiting examples of materials commonly used for reactor construction (i.e. including reactor vessel walls) are alloys of iron with other metals including chromium, nickel, manganese, vanadium, molybdenum, titanium and silicon. Non-limiting examples of suitable steel grades are 310, 316, and alloy 625.

In certain embodiments, "intrinsic" catalysts that may be provided by the vessel walls of a reactor apparatus are transition/noble metals.

Non-limiting examples of "intrinsic" catalysts may be provided by the vessel walls of a reactor apparatus include iron metal, hydroxides of iron, oxides of iron, carbonates of iron, hydrogen carbonates of iron, acetates of iron; nickel metal, hydroxides of nickel, oxides of nickel, carbonates of nickel, hydrogen carbonates of nickel; chromium metal, hydroxides of chromium, oxides of chromium, carbonates of chromium, hydrogen carbonates of chromium; manganese metal, hydroxides of manganese metal, oxides of manganese metal, carbonates of manganese metal, and/or hydrogen carbonates of manganese metal. Hydroxides may be present by virtue of reaction of the metals with water and alkaline "additional" catalysts. Oxides may be present by virtue of reaction of metals with oxygen-containing compounds and as passivating layers. Carbonates and hydrogen carbonates may be present by virtue of reactions of metals, metal oxides and/or metal hydroxides with carbon dioxide generated in-situ by decarboxylation reactions. Acetates of metals may be present by virtue of reactions of metals, metal oxides, metal hydroxides, metal hydrogen carbonates and metal carbonates with acetic acid generated in-situ by hydrolysis of organic matter.

Metals and metal compounds associated with surfaces made of steel and similar materials may catalyse various reactions including, but not limited to, one or more of the reactions described in Table 1 above. For example, the catalysts may catalyse hydrothermal reactions such as, for example, decarboxylation reactions (see, for example, Maiella and Brill, "*Spectroscopy of Hydrothermal Reactions. 10. Evidence of Wall Effects in Decarboxylation Kinetics of* 1.00 *m* $HCO_2X$ ($X=H, Na$) *at* 280-330° C. *and* 275 *bar*", J. Phys. Chem. A (1998), 102, 5886-5891) and hydrogen transfer reactions (see, for example, Onwudili and Williams, "*Hydrothermal reactions of sodium formate and sodium acetate as model intermediate products of the sodium hydroxide promoted hydrothermal gasification of biomass*", Green Chem., (2010), 12, 2214-2224).

(iii) Recycling of Catalysts

Catalysts according to the invention may be recycled for use in subsequent reactions for conversion of organic matter feedstock into biofuel. The recycled catalysts may be "additional" catalysts and/or "intrinsic" catalysts as described herein.

By way of non-limiting example only, intrinsic catalysts (e.g. alkali salts such as potassium and calcium salts) may be transferred to the aqueous liquid phase during the reaction. Because significant concentrations of such catalysts (e.g. alkali salts of potassium and calcium) may be present in organic matter feedstocks processed according to methods of the invention, in certain embodiments aqueous phases containing dissolved catalysts (e.g. potassium and/or calcium salts) may be recycled.

Accordingly, in certain embodiments intrinsic catalysts from various reaction component(s) (e.g. from any one or more of the organic matter feedstock, the aqueous solvent, and/or vessel walls of a reactor apparatus) may be renewed in situ alleviating or reducing the need to provide "additional" catalysts in subsequent rounds of feedstock conversion. This may be particularly advantageous in embodiments of the invention relating to extended operation at scales at or larger than pilot plant scale. In general, it is contemplated that the recycling of intrinsic catalysts present in reaction components such as organic matter feedstock (e.g. alkali salts) may allow for a situation where "additional" catalysts are required during start-up operation only.

In preferred embodiments, an "intrinsic" catalyst recycled in the reaction process is an alkali and/or alkaline earth metal salt (e.g. potassium, calcium and/or sodium salts).

Exemplary Reaction Conditions

In certain embodiments, organic matter treated using the methods of the invention is (or comprises) fossilised organic matter (see section above entitled "Organic matter"). For example, the organic matter treated may be lignite.

Conversion of the fossilised organic matter into biofuel may be conducted, for example, by performing the steps of: (i) contacting the matter with a supercritical aqueous solvent (wherein the aqueous solvent is in a supercritical state prior to contact with the organic matter) and (ii) treating the resulting reaction mixture at temperature(s) of between about 200° C. and about 400° C. and pressure(s) of between about 150 bar and about 350 bar; preferably at temperature(s) of between about 250° C. and about 375° C. and pressure(s) of between about 175 bar and about 300 bar; more preferably at temperature(s) of between about 300° C. and about 375° C. and pressure(s) of between about 200 bar and about 250 bar; more preferably at temperature(s) of between about 320° C. and about 360° C. and pressure(s) of between about 200 bar and about 250 bar; and still more preferably at temperature(s) of between about 340° C. and about 360° C. and pressure(s) of between about 200 bar and about 240 bar.

Preferably, the temperature of the organic matter prior to contacting the supercritical aqueous solvent is at least about 40° C., 50° C., 60° C., 70° C., 80° C., or 90° C. less than the critical temperature of the aqueous solvent.

Preferably, the supercritical aqueous solvent is water, or an aqueous alcohol (e.g. aqueous ethanol or methanol) comprising between about 1% and about 5% w/v alcohol, an aqueous alcohol (e.g. aqueous ethanol or methanol) comprising between about 1% and about 10% w/v alcohol, between about 5% and about 15% w/v alcohol, or between about 5% and about 20% w/v alcohol. The skilled addressee would readily be able to determine the critical point of a particular aqueous solvent and thereby determine the temperature and pressure required to bring the solvent into a supercritical state.

Preferably, the retention time is between about 15 minutes and about 45 minutes, more preferably between about 15 minutes and about 40 minutes, and still more preferably between about 20 minutes and about 30 minutes.

Conversion of the fossilised organic matter into biofuel may be enhanced by the use of one or more additional catalysts (see subsection above entitled "Catalysts"). For example, the conversion may be enhanced by the use of an additional transfer hydrogenation catalyst (e.g. formic acid, sodium formate, and/or sodium hydroxide (under a reducing atmosphere)) or an additional direct hydrogenation catalyst (e.g. Ni, Pt, Pd on silica or carbon (under a reducing atmosphere)).

Accordingly, in some embodiments a biofuel may be produced from organic matter comprising fossilised organic matter (e.g. lignite) by performing the steps of: (i) contacting the matter with a supercritical aqueous solvent (e.g. supercritical water) (wherein the aqueous solvent is in a supercritical state prior to contact with the organic matter), and (ii) treating the resulting reaction mixture at temperature(s) of between 300° C. and 375° C. and pressure(s) of between about 200 bar and about 250 bar, and a retention time of more than about 15 minutes. Optionally, the production of biofuel may be enhanced by the use of one or more additional catalysts as described herein. The additional catalysts may comprise one or more transfer hydrogenation catalysts (e.g. sodium formate, sodium hydroxide (under a reducing atmosphere), formic acid and/or formate).

In certain embodiments, the reaction comprises an alkali metal hydroxide and/or alkali metal carbonate catalyst (e.g. sodium hydroxide, and/or sodium carbonate) in the range of about 0.1 Molar to about 1 Molar (in the reaction). In preferred embodiments, the concentration may be about 0.1 Molar to about 0.3 Molar.

In certain embodiments, organic matter treated using the methods of the invention is (or comprises) lignocellulosic matter (see section above entitled "Organic matter"). For example, the organic matter treated may be radiata pine.

Conversion of the lignocellulosic matter into biofuel may be conducted, for example, by performing the steps of (i) contacting the matter with a supercritical aqueous solvent (wherein the aqueous solvent is in a supercritical state prior to contact with the organic matter), and (ii) treating the resulting reaction mixture at temperature(s) of between about 200° C. and about 400° C. and pressure(s) of between about 150 bar and about 350 bar; preferably at temperature(s) of between about 250° C. and about 375° C. and pressure(s) of between about 150 bar and about 250 bar; more preferably at temperature(s) of between about 270° C. and about 360° C. and pressure(s) of between about 170 bar and about 250 bar; and more preferably at temperature(s) of between about 300° C. and about 340° C. and pressure(s) of between about 200 bar and about 240 bar.

Preferably, the temperature of the organic matter prior to contacting the supercritical aqueous solvent is at least about 40° C., 50° C., 60° C., 70° C., 80° C., or 90° C. less than the critical temperature of the aqueous solvent.

Preferably, the supercritical aqueous solvent is selected from an aqueous alcohol (e.g. aqueous ethanol or aqueous methanol) comprising between about 1% and about 50% w/v alcohol, between about 1% and about 40% w/v alcohol, between about 5% and about 50% w/v alcohol, between about 5% and about 35% w/v alcohol, between about 5% and about 30% w/v alcohol, between about 10% and about 30% w/v alcohol, between about 15% and about 25% w/v alcohol, or between about 18% and about 22% w/v alcohol. The skilled addressee would readily be able to determine the critical point of a particular aqueous alcohol solvent and thereby determine the temperature and pressure required to bring the solvent into a supercritical state.

Conversion of the lignocellulosic matter into biofuel may be enhanced by the use of one or more additional catalysts (see subsection above entitled "Catalysts"). For example, the conversion may be enhanced by the use of an additional transfer hydrogenation catalyst (e.g. formic acid, sodium formate and/or sodium hydroxide).

In certain embodiments, the reaction comprises an alkali metal hydroxide and/or alkali metal carbonate catalyst (e.g. sodium hydroxide, and/or sodium carbonate) in the range of about 0.1 Molar to about 1 Molar (in the reaction). In preferred embodiments, the concentration may be about 0.1 Molar to about 0.3 Molar.

Accordingly, in some embodiments a biofuel may be produced from organic matter comprising lignocellulosic by performing the steps of: (i) contacting the matter with an aqueous supercritical solvent (e.g. an aqueous alcohol comprising between about 5% and about 50% w/v of aqueous alcohol (e.g. aqueous ethanol of methanol)) (wherein the aqueous solvent is in a supercritical state prior to contact with the organic matter), and (ii) treating the resulting reaction mixture at temperature(s) of between 250° C. and 400° C. and pressure(s) of between about of between about 150 bar and about 250 bar, for a retention time of more than about 15 minutes. Optionally, the conversion may be enhanced by the use of one or more additional catalysts as described herein. The additional catalyst may comprise one or more transfer hydrogenation catalysts (e.g. formic acid, formate and/or sodium hydroxide).

Continuous Flow

Biofuel production from organic matter using the methods of the invention may be enhanced by performing the methods under conditions of continuous flow. For example, heating/pressurisation of organic matter and/or aqueous solvent, contact of the organic matter with the supercritical solvent, maintenance of the resulting reaction mixture at target temperature(s)/pressure(s), and cooling/depressurisation may be performed while the organic material, solvent, reaction mixture and/or product are maintained in a continuously moving stream along the length of a given surface (e.g. the walls of a reactor vessel).

Although the methods of the invention need not be performed under conditions of continuous flow, doing so may provide a number of advantageous effects. For example, continuous flow may facilitate the accelerated implementation and/or removal of heat and/or pressure applied to the organic matter, aqueous solvent and/or reaction mixture (comprising organic matter and aqueous solvent). This may assist in achieving the desired rates of mass and heat transfer, heating/cooling and/or pressurisation/de-pressurisation. Continuous flow may also allow the retention time to be tightly controlled. Without limitation to a particular mode of action, it is postulated that the increased speed of heating/cooling and/or pressurisation/de-pressurisation facilitated by continuous flow conditions along with the capacity to tightly regulate retention time assists in preventing the occurrence of undesirable side-reactions (e.g. polymerisation) as the organic matter, aqueous solvent and/or reaction mixture heats/pressurises and the product cools/de-pressurises. Continuous flow is also believed to enhance reactions responsible for conversion of organic matter into biofuel by virtue of generating mixing and shear forces believed to aid in emulsification which may be an important mechanism involved in the transport and "storage" of the oils generated away from the reactive surfaces of the feedstock.

Accordingly, in preferred embodiments the methods of the invention are performed under conditions of continuous flow. As used herein, the term "continuous flow" refers to a process wherein:
(a) formation of the reaction mixture comprising organic matter and aqueous solvent (including heating and/or pressurisation of individual component/s and the addition of catalysts if required)
(b) treatment of the reaction mixture at target temperature(s) and pressure(s) for a defined time period (i.e. the "retention time"), and
(c) cooling and de-pressurisation, are performed while the organic matter, reaction mixture and product (each in the form of a slurry) are maintained in a stream of continuous movement along the length (or partial length) of given surface/s.

Continuous flow conditions as contemplated herein imply no particular limitation regarding flow velocity of material provided that it is maintained in a stream of continuous movement.

The use of a suitable flow velocity (under conditions of continuous flow) may be advantageous in preventing scale-formation along the length of a particular surface that the slurry moves along (e.g. vessel walls of a reactor apparatus) and/or generating an effective mixing regime for efficient heat transfer into and within the slurry.

Preferably, the minimum (volume-independent) flow velocity of a slurry (e.g. organic matter, reaction mixture and/or product) along a given surface exceeds the settling velocity of solid matter within the slurry or reaction mixture (i.e. the terminal velocity at which a suspended particle having a density greater than the surrounding aqueous solution moves (by gravity) towards the bottom of the stream of slurry).

For example, the minimum flow velocity of the slurry (and/or aqueous solvent) may be above about 0.01 cm/s, above about 0.05 cm/s, preferably above about 0.5 cm/s and more preferably above about 1.5 cm/s. The upper flow velocity may be influenced by factors such as the volumetric flow rate and/or retention time. This in turn may be influenced by the components of a particular reactor apparatus utilised to maintain conditions of continuous flow.

Continuous flow conditions may be facilitated, for example, by performing the methods of the invention in a suitable apparatus (e.g. see section below entitled "Apparatus for biofuel production"). A suitable apparatus will generally comprise heating/cooling, pressurising/de-pressuring and reactor components in which a continuous stream of slurry is maintained.

Biofuel Products

The methods of the invention may be used to produce biofuel from organic matter. The nature of the biofuel product may depend on a variety of different factors including, for example, the organic material feedstock, and/or the reaction conditions/reagents utilised in the methods.

In certain embodiments, the biofuel product may comprise one or more of bio-oil, oil char (e.g. carbon char with bound oils), soluble light oil, gaseous product (e.g. methane, hydrogen, carbon monoxide and/or carbon dioxide), alcohol (e.g. ethanol, methanol and the like), and biodiesel.

In certain embodiments, a biofuel may be produced from fossilised organic matter such as, for example, lignite (brown coal), peat or oil shale. The biofuel may comprise solid, liquid and gas phases. The solid phase may comprise a high carbon char (upgraded pulverised coal injection PCI equivalent coal). The liquid phase may comprise bio-oils. The gaseous product may comprise methane, hydrogen, carbon monoxide and/or carbon dioxide.

In other embodiments, a biofuel may be produced from organic matter comprising lignocellulosic matter. The biofuel may comprise a liquid phase comprising bio-oil.

Biofuels produced in accordance with the methods of the invention may comprise a number of advantageous features, non limiting examples of which include reduced oxygen content, increased hydrogen content, increased energy content and increased stability.

A bio-oil product (also referred to herein as an "oil" product) produced in accordance with the methods of the invention may comprise an energy content of greater than about 25 MJ/kg, preferably greater than about 30 MJ/kg, more preferably greater than about 32 MJ/kg, still more preferably greater than about 35 MJ/kg, and even more preferably greater than about 37 MJ/kg, 38 MJ/kg or 39 MJ/kg. The bio-oil product may comprise less than about 15% wt db oxygen, preferably less than about 10% wt db oxygen, more preferably less than about 8% wt db oxygen and still more preferably less than about 7% wt db oxygen. The bio-oil product may comprise greater than about 6% wt db hydrogen, preferably greater than about 7% wt db hydrogen, more preferably greater than about 8% wt db hydrogen, and still more preferably greater than about 9% wt db hydrogen. The molar hydrogen:carbon ratio of a bio-oil of the invention may be less than about 1.5, less than about 1.4, less than about 1.3, or less than about 1.2.

A bio-oil produced in accordance with the methods of the invention may comprise, for example, any one or more of the following classes of compounds: phenols, aromatic and aliphatic acids, ketones, aldehydes, hydrocarbons, alcohols, esters, ethers, furans, furfurals, terpenes, polycyclics, oligo- and polymers of each of the aforementioned classes, plant sterols, modified plant sterols, asphaltenes, pre-asphaltenes, and waxes.

A char or oil char product produced in accordance with the methods of the invention may comprise an energy content of greater than about 20 MJ/kg, preferably greater than about 25 MJ/kg, more preferably greater than about 30 MJ/kg, and still more preferably greater than about 31 MJ/kg, or 32 MJ/kg. The char or oil char product may comprise less than about 20% wt db oxygen, preferably less than about 15% wt db oxygen, more preferably less than about 10% wt db oxygen and still more preferably less than about 9% wt db oxygen. The char or oil char product may comprise greater than about 2% wt db hydrogen, preferably greater than about 3% wt db hydrogen, more preferably greater than about 4% wt db hydrogen, and still more preferably greater than about 5% wt db hydrogen. The molar hydrogen:carbon ratio of a char or oil char product of the invention may be less than about 1.0, less than about 0.9, less than about 0.8, less than about 0.7, or less than about 0.6.

An oil char product produced in accordance with the methods of the invention may comprise, for example, any one or more of the following classes of compounds: phenols, aromatic and aliphatic acids, ketones, aldehydes, hydrocarbons, alcohols, esters, ethers, furans, furfurals, terpenes, polycyclics, oligo- and polymers of each of the aforementioned classes, asphaltenes, pre-asphaltenes, and waxes.

A char product (upgraded PCI equivalent coal) produced in accordance with the methods of the invention may comprise, for example, a mixture of amorphous and graphitic carbon with end groups partially oxygenated, giving rise to surface carboxy- and alkoxy groups as well as carbonyl and esters.

Biofuels produced in accordance with the methods of the invention may be cleaned and/or separated into individual components using standard techniques known in the art.

For example, solid and liquid phases of biofuel product (e.g. from the conversion of coal) may be filtered through a pressure filter press, or rotary vacuum drum filter in a first stage of solid and liquid separation. The solid product obtained may include a high carbon char with bound oils. In certain embodiments, the oil may be separated from the char, for example, by thermal distillation or by solvent extraction. The liquid product obtained may contain a low percentage of light oils, which may be concentrated and recovered though an evaporator.

A bio-oil product (e.g. from the conversion of lignocellulosic matter) may be recovered by decanting or by density separation. Water soluble light oils may be concentrated and recovered through an evaporator. Bio-oils produced in accordance with the methods of the invention may be polished or distilled to remove any remaining water or in preparation for further processing.

Biofuel produced in accordance with the methods of the invention may be used in any number of applications. For example, the biofuels may be blended with other fuels, including for example, ethanol, diesel and the like. Additionally or alternatively, the biofuels may be upgraded into higher fuel products. Additionally or alternatively, the biofuels may be used directly, for example, as petroleum products and the like.

Apparatus for Biofuel Production

Referring to the schematic flow process chart shown in FIG. 1, an exemplary continuous flow apparatus 1 is shown for the conversion of organic matter to biofuel using supercritical solvent (and optionally additional catalyst(s) and/or alcohols) according to an embodiment of the invention. It will be appreciated by persons skilled in the art that numerous variations and/or modifications may be made to the apparatus (and components thereof) described in this section without departing from the invention concept(s) disclosed.

Organic matter 2 (e.g. lignite and/or lignocellulosic matter) is mixed with a suitable liquid 3 and/or 4 (e.g. water) in a commination tank 5 (e.g. a ball milling tank) to produce a slurry comprising solid particles of a preferred particle size (e.g. between about 5 and about 2000 microns, preferably between about 10 and about 500 microns, and more preferably between about 200 and about 400 microns). Particle size in the slurry is monitored by a particle size classifier 6 (e.g. a screen, cyclone, decanter etc). Although the exemplified device for monitoring particle size is a decanter quality control device, the skilled person will recognise that any other suitable device may be used to ensure particle device accuracy such as, for example, a wet sieve or a liquid cyclone. The slurry is pumped from mixing tank 5 into slurry storage tank 7 using, for example, a low pressure slurry supply pump (e.g. a peristaltic pump or diaphragm pump) which provides a positive pressure to high pressure pump 8.

Slurry is fed from storage tank 7 through a high pressure pump 8. This propels the slurry through preheater 9 (where optional heating of the pressurised slurry may occur) and into injection device 11 where the slurry is contacted/mixed with supercritical solvent. Preheater 9 may be, for example, a single pass continuous vessel heated by a suitable heat exchange medium (e.g. heat transfer oil, steam or water) circulated by circulation pump 10. For example, circulation pump 10 may be used to pump heat transfer oil or water in a circuit 15 between preheater 9 and slurry cooler 24. This facilitates heating of the oil or water at slurry cooler 24 (as heated product passes through slurry cooler 24) and the heated oil or water then circulates back to preheater 9 where it transfers heat to the slurry.

Alternatively, optional preheating of the slurry may be achieved by any other means. For example, slurry may be pre-heated by steam injection of organic matter to form a slurry (e.g. at 10 bar and 180° C.) in a pressurised slurry batch tank. The slurry may then be fed through high pressure pump 8 and optionally a second heat exchanger for further heating. Slurry may be pre-heated after passing through a low pressure slurry supply pump (e.g. a peristaltic pump or diaphragm pump) but prior to reaching the high pressure pump 8 by appropriate means such as, for example, a spiral heat exchanger.

A supercritical boiler 19 powered, for example, by electricity or by combustion of fuel (e.g. natural gas 12 and/or upgraded coal/oil 13) receives water 14 via a boiler feedwater pump 18 which brings the water to desired pressure allowing for some loss of pressure through the system. The water 14 may optionally be pre-treated for hardness and/or purity (e.g. removal of suspended and/or dissolved solids) at a boiler water treatment plant 15 and/or optionally de-aerated in de-aerator feedwater tank 17 (e.g. by steam stripping), in which case a transfer pump 16 is used to pump water into and through de-aerator feedwater tank 17. Water treatment chemicals (e.g. hydrazine compounds for oxygen scavenging and/or amines to raise pH and passivate steel vessels in the apparatus) may also optionally be added to the water.

Supercritical water exits boiler 19 at the desired target temperature (e.g. between 450° C. and 600° C.) and is propelled under pressure into injection device 11 where it contacts the slurry. This contact may initiate a supercritical to subcritical phase change in the solvent.

Figure 2:
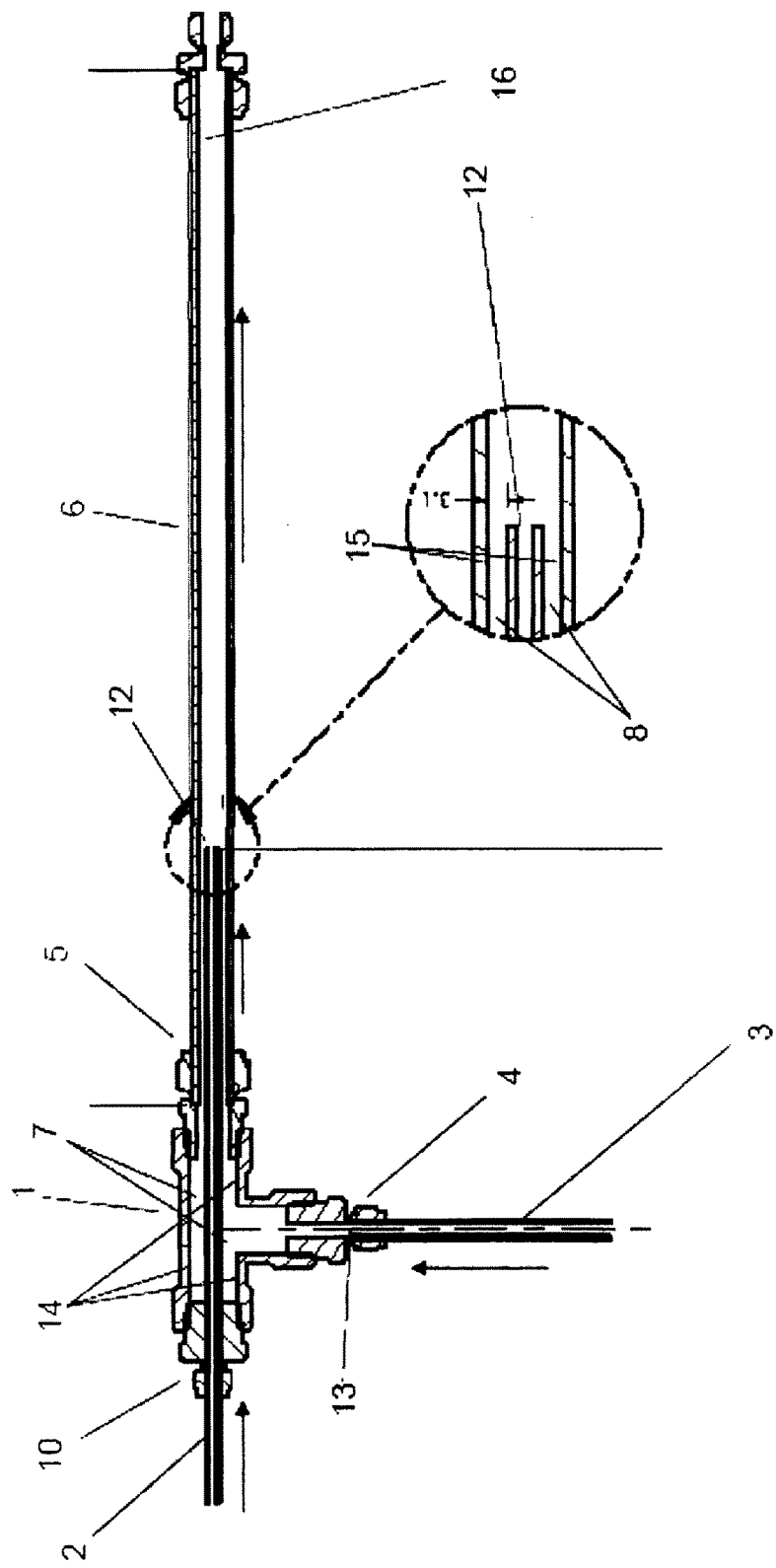
FIG. 2 is a schematic perspective view of an injection device of the apparatus of FIG. 1 in accordance with an embodiment of the invention.

Referring to FIG. 2, an injection device in accordance with one embodiment of the invention may be provided in a substantially "T-shaped" arrangement in which first 2 and second 3 vessels are each inserted into orifices 10 and 4, respectively, of a substantially T-shaped connecting piece 1. A third vessel 6 is inserted into orifice 5 of connecting piece 1. Second vessel 3 terminates within connecting piece 1 at open end 13. First vessel 2 passes through the interior of connecting piece 1 and terminates outside connecting piece 1 within third vessel 6 at open end 12.

Connecting piece 1 is sealed (or substantially sealed) at orifices 10, 4, and 5 such that material may only pass through vessel 3 (orifice 4), vessel 2 (orifices 10 and 5), or vessel 6 (orifice 5). A first cavity 7 exists between the outer wall of first vessel 2 and interior wall 14 of connecting piece 1. A second cavity 8 exists between the outer wall of first vessel 2 and the interior wall 15 of third vessel 6. First cavity 7 is in communication with second cavity 8 such that material may pass from first cavity 7 into second cavity 8.

During use, slurry is propelled under pressure through first vessel 2 toward open end 12. Supercritical solvent is propelled under pressure through vessel 3 toward open end 13 where it enters cavity 7 of connecting piece 1. Supercritical solvent fills cavity 7 and is forced under pressure into third vessel 6 where it moves through cavity 8 towards open end 12 of vessel 2. Slurry exiting first vessel 2 at open end 12 contacts supercritical solvent which undergoes a supercritical to subcritical phase change. The mixture of slurry/solvent is propelled along third vessel 6 toward upstream position 16. Movement of the slurry and solvent into and within the injection device, and movement of the slurry/solvent mixture within and out of the device occurs under continuous flow.

Figure 3:
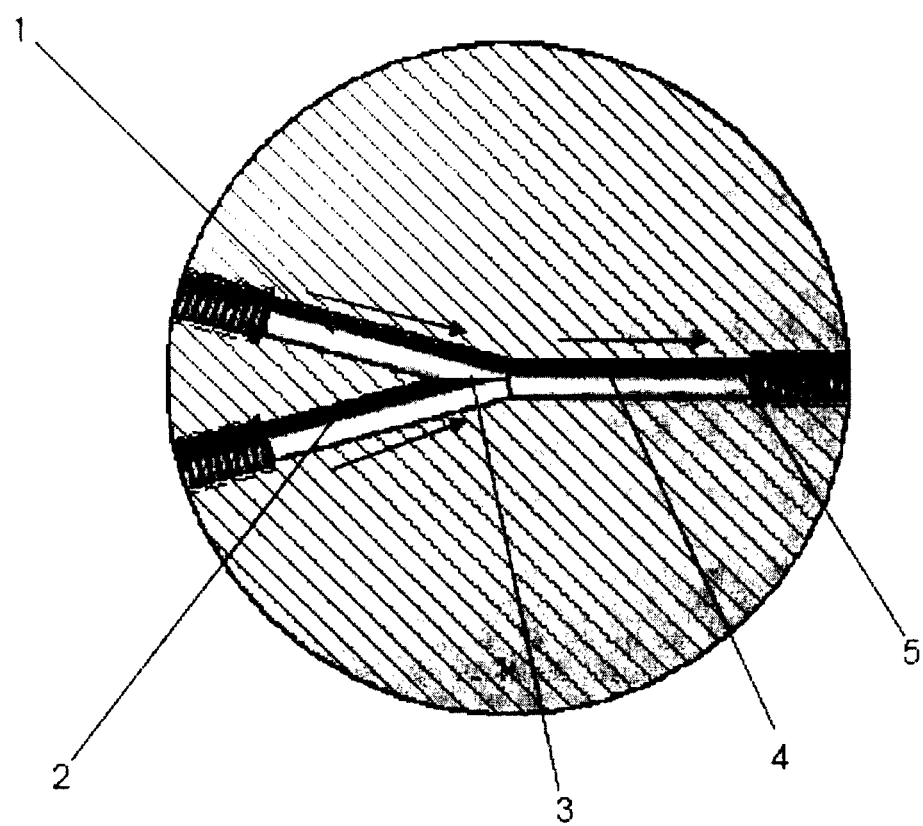
FIG. 3 is a schematic perspective view of an injection device of the apparatus of FIG. 1 in accordance with another embodiment of the invention.

Referring to FIG. 3, an injection device in accordance with another embodiment of the invention may be provided in a substantially "Y-shaped" arrangement in which first 1, second 2, and third 4 vessels intersect at junction 3. Junction 3 facilitates communication between each of first vessel 1, second vessel 2 and third vessel 4 such that material may pass from first vessel 1 and second vessel 2 into third vessel 4.

During use, slurry is propelled under pressure through first vessel 1 toward junction 3. Supercritical solvent is propelled under pressure through second vessel 2 toward junction 3. The slurry and supercritical solvent come into contact at junction 3 causing the solvent to undergo a supercritical to subcritical phase change. The mixture of slurry/solvent is propelled under pressure along third vessel 4 toward upstream position 5. Movement of the slurry and solvent into and within the injection device, and movement of the slurry/solvent mixture within and out of the device occurs under continuous flow.

Figure 4:
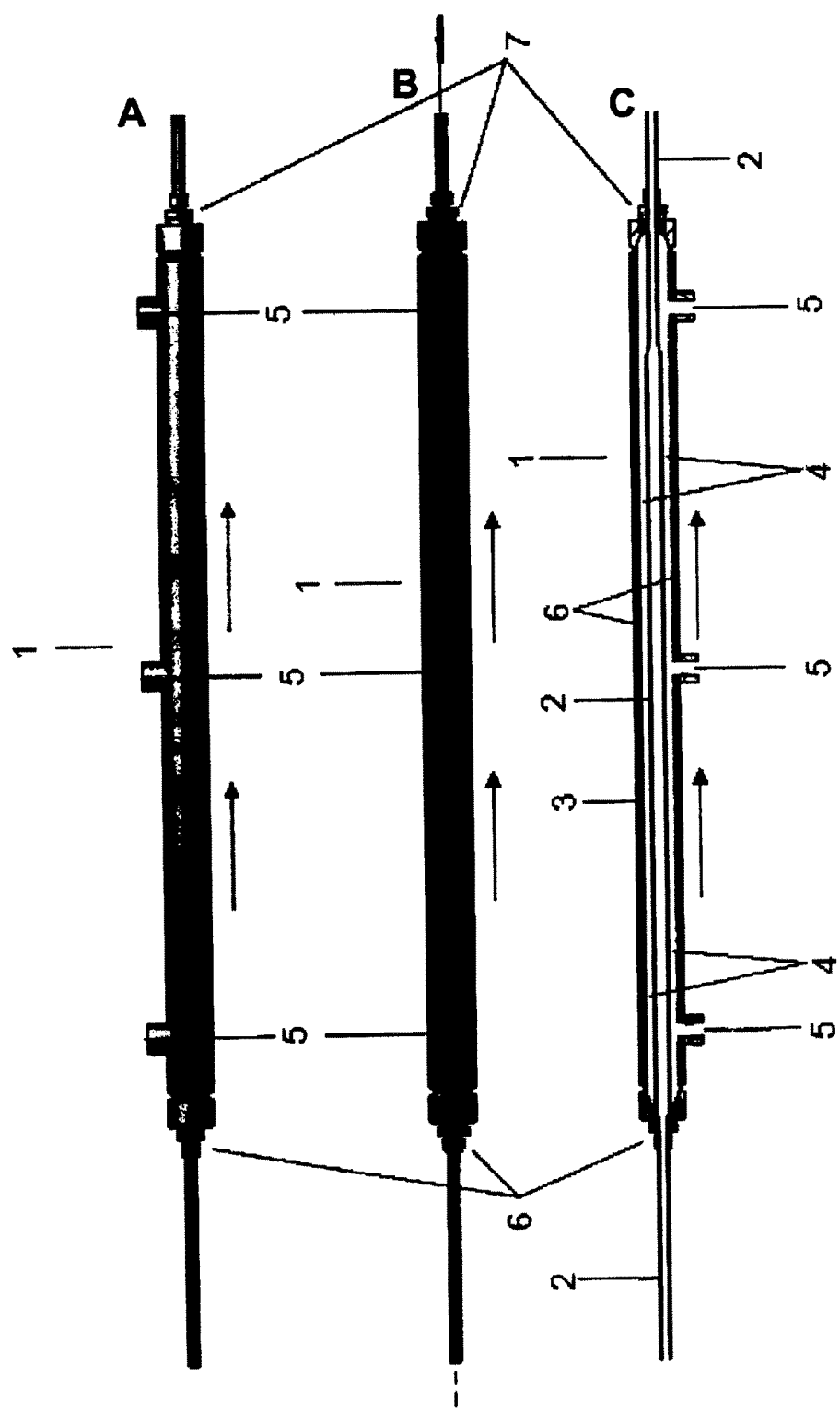
FIG. 4 is a schematic perspective view of an injection device of the apparatus of FIG. 1 in accordance with an additional embodiment of the invention.

Referring to FIG. 4, an injection device in accordance with an additional embodiment of the invention may be provided in the form of a vessel arrangement 1 comprising a first inner vessel 2 constructed of a porous material (e.g. sintered metal) encapsulated by a second outer vessel 3. Inner vessel 2 is inserted into outer vessel 3 through orifices 6 and 7 of outer vessel 3. Outer vessel 3 is substantially sealed at orifices 6 and 7 such that material may only pass through inner vessel 2. A cavity 4 exists between the outer wall of porous inner vessel 2 and the interior wall 6 of outer vessel 3. The outer vessel 3 comprises one or more inlet(s) 5 through which material can pass into cavity 4.

During use, slurry is propelled under pressure through porous inner vessel 2 toward orifice 7. Supercritical solvent is propelled under pressure through inlet(s) 5 into cavity 4 and permeates through porous inner vessel 2 where it contacts the slurry. Contact with the slurry causes the solvent to undergo a supercritical to subcritical phase change. The mixture of slurry/solvent is propelled under pressure along porous inner vessel 2 towards orifice 7. It is envisaged that the use of multiple inlets 5 to disseminate supercritical solvent into cavity 4 such that the solvent permeates into porous inner vessel 2 along its length serves to reduce thermal shock to the slurry. Movement of the slurry and solvent into and within the injection device, and movement of the slurry/solvent mixture within and out of the device occurs under continuous flow.

Referring back to FIG. 1, slurry/solvent mixture is propelled under pressure from injection device 11 through vessel 19 towards reactor 20. Additional catalyst(s) 21 (e.g. sodium hydroxide) may optionally be added to the slurry/solvent mixture as it is propelled through vessel 19 prior to reaching reactor 20 (preferably immediately after exiting injection device 11), for example, by way of additional vessel(s) that intersect with or that are inserted into vessel 19 at one or more position(s).

Although not shown the skilled person will recognise that catalyst(s) may be added to the slurry and/or solvent prior to formation of the reaction mixture.

Slurry/solvent mixture moves into and through reactor 20. Reaction temperature is maintained in reactor 20 by a trace heating element 23 and retention time may be controlled by regulating the flow of slurry/solvent mixture through the reactor. Product exits reactor 20 and moves through vessel 27 into and through slurry cooler 24. Slurry cooler 24 facilitates controlled cooling of the product to a specific target temperature over a specific time period. Cooled product exits reactor apparatus 25 through pressure let down device 26 into product holding tank 28. Product holding tank 28 may comprise water maintained at, for example, ambient or below-ambient temperature to assist in cooling the product further and separating gaseous product 29 from solid and liquid products. Solid product 30 (e.g. char) and liquid product 31 (e.g. bio-oil) may be separated, for example, by treatment in a vacuum drum filter 32, although the skilled person will recognise that any suitable process could be used (e.g. gravity settling, centrifugation, pressure filtration and the like).

Alcohol (e.g. methanol and/or ethanol) may optionally be incorporated into the slurry, for example, in mixing tank 5, slurry storage tank 7, preheater 9, vessel(s) running between them, and/or vessel(s) running between preheater 9 and injection device 11. Additionally or alternatively, alcohol may be incorporated into the solvent 14 at any point prior to reaching injection device 11. Additionally or alternatively, alcohol may be incorporated into the slurry/solvent mixture as it moves through injection device 11 and/or as it moves through vessel 19 prior to reaching reactor 20.

It will be understood that the apparatus 1 preferably operates under conditions of continuous flow in which the slurry, reaction mixture and/or product stream are maintained in a continuously moving stream along the length of a given surface within the apparatus. For example, material (e.g. slurry, solvent, slurry/solvent mixture and product) may move in between high pressure pump 8 and pressure let down device 26, under conditions of continuous flow at a rate defined by pressure imposed by high pressure pump 8 and boiler feedwater pump 18 in combination with pressure let down device 26. Materials entering and/or exiting the apparatus (e.g. organic matter, product, water, solvent, alcohol, and/or catalysts) may also do so in a continuously moving stream thus enhancing and/or facilitating the continuous flow of material(s) within the apparatus.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

EXAMPLES

The invention will now be described with reference to specific examples, which should not be construed as in any way limiting.

Example 1: Conversion of Lignite (Source a) and Lignocellulosic Biomass to Biofuel 1. Apparatus The apparatus consisted in part of a continuous flow elongated reactor assembly with high surface area, constructed of 310 stainless steel. Because of the high degree of interaction of the reacting materials with the reactor wall under continuous flow conditions, i.e. turbulent with small radius (21.4 mm inches maximum and 4.25 mm minimum) and significant length (total 84 meters), the following "intrinsic" catalysts were present in each of the different reactions described (i.e. regardless of whether "additional" catalysts were included): iron metal, hydroxides of iron, oxides of iron, carbonates of iron, hydrogen carbonates of iron, acetates of iron; nickel metal, hydroxides of nickel, oxides of nickel, carbonates of nickel, hydrogen carbonates of nickel; chromium metal, hydroxides of chromium, oxides of chromium, carbonates of chromium, hydrogen carbonates of chromium; manganese metal, hydroxides of manganese metal, oxides of manganese metal, carbonates of manganese metal, hydrogen carbonates of manganese metal. Hydroxides were present by virtue of reaction of the metals with water and alkaline additional catalysts. Oxides were present by virtue of reaction of metals with oxygen-containing compounds and as passivating layers. Carbonates and hydrogen carbonates were present by virtue of reactions of metals, metal oxides and metal hydroxides with carbon dioxide generated in-situ by decarboxylation reactions. Acetates of metals were present by virtue of reactions of metals, metal oxides, metal hydroxides, metal hydrogen carbonates and metal carbonates with acetic acid generated in-situ by hydrolysis of organic matter.

2. Slurry Preparation

Feedstock was ground to a micron level suitable for pumping. The grinding process was wet or dry depending on the nature of the feedstock (i.e. lignite or lignocellulosic biomass). The ground feedstock was passed through a screening system to remove any remaining oversize particles or foreign objects. The feedstock was then slurried with water in mixing tanks, pumped into feed tanks and held ready for processing. This step may be continuous using mixing augers or paddle mixers. A low pressure pump was also used as a source of positive pressure to the main high pressure slurry pump (most high pressure pumps require positive pressure) (see description below).

In certain cases alcohols (methanol or ethanol) (e.g. 20% wt relative to water present in the slurry) was added to the slurry (see Table 2B). Although in this case an alcohol (e.g. methanol or ethanol) was added to the slurry, it may also be added during other stage(s) of the process including, for example:
  (a) injected by low pressure pump into the slurry pipe between the slurry supply pump and the high pressure pump.
  (b) injected into the high pressure slurry line before or after the heat exchanger (see 3.1 below)
  (c) injected into the injecting device or immediately after slurry/solvent mixture exits the injecting device (see 4.1 below).
  (d) injected into the solvent supply line at any time prior to the solvent reaching the injecting device Stages 3-5 below were conducted under continuous flow conditions.

3. Heating and Pressurisation 3.1 Slurry

Slurry from feed tanks was pressurised by passage through high pressure pump. After pressurisation, the slurry was propelled through a heat exchanger where it can optionally be heated (e.g. to 175° C. or more) and on into an injection device where it contacted the supercritical solvent.

The heat exchanger may be, for example, a single pass continuous tube provided with heat by a heat exchange medium such as heat transfer oil. The heat transfer oil may also be used to cool the slurry after exit from the reactor and before pressure let down. Alternatively water/steam cycle may be used as the heat exchange medium. Water under pressure (e.g. 10 bar) may be used to cool the slurry after exit from the reactor and become heated during that process. It is then circulated back to the heat exchanger where it is flashed off and subsequent condensation passes the heat to the incoming slurry. The condensed water may then be re-pressurised using a standard boiler feedwater pump and re-circulated back to cool slurry exiting from the reactor.

3.2 Solvent

Water was pre-treated for hardness (target 2 ppm) using a boiler water treatment plant, and a transfer pump used to transport it through a de-aerator feedwater tank and into a high pressure boiler feedwater pump which pressurised the water beyond its critical point. The water was then brought into a supercritical state by heating in a supercritical boiler powered, for example, by electricity or by combustion of fuel (e.g. natural gas, upgraded coal, and/or oil). Supercritical water exiting the boiler at the desired target temperature/pressure (e.g. 450° C.-600° C./200-250 bar) was propelled into an injection device where it contacted the slurry.

A summary of feedstock/slurry and solvent characteristics and the parameters they were treated under prior to contacting each other in the injecting device is provided in the relevant sections of Tables 2A and 2B below.

3.3 Control of Pressure

The pressure of the entire system is controlled by the pressure let down device (primary control) with the slurry feed rate acting in a cascade control method as a secondary set point. The supercritical water injection rate follows the slurry and is varied to maintain the desired temperature after the mixing device prior to entering the reactor. In cases where the pressure let down device (see point 5 below) is a fixed orifice device then the pressure is controlled by the slurry pressure pump speed. The supercritical water injection flow is controlled by the final desired temperature but has a cascade control back to the system pressure.

4. Conversion of Organic Matter into Biofuel 4.1 Solvent/Slurry Contact

Pressurised (and optionally preheated) slurry was brought into contact with the supercritical solvent in an injection device. The temperature of the slurry was sufficiently below the critical temperature of the solvent to initiate a supercritical to subcritical phase change in the solvent upon contacting it releasing an energy "burst" which enhanced decomposition/conversion of organic matter in the slurry. The resulting solvent/slurry mixture was maintained in at target temperature and pressure for the remainder of the process (see Tables 2A and 2B).

4.2 Reactor

The solvent/slurry mixture was pumped into a reactor designed to keep the slurry in a laminar flow regime for a specific residence time (i.e. "retention time"). The reactor comprises of a series of multiple tubular reaction vessels which may be coupled or decoupled to adjust the total residence time. The residence time utilised depended on the time that was required for sufficient conversion of the feedstock into biofuel to take place, and in some cases varied depending upon the nature of the feedstock, the nature of the solvent utilised, and/or the presence/absence of additional catalysts in the slurry (see Tables 2A and 2B). The reactor utilised has external trace heating so that accurate control of the temperature profile could be achieved.

4.3 Additional Catalysts

In certain cases, additional catalyst(s) were used to enhance conversion of the organic matter into biofuel (see Tables 2a and 2b). The additional catalyst(s) was/were added to the solvent/slurry mixture immediately after exiting the injection device (as any dissolved salts etc. may drop out of solution when present in a supercritical fluid resulting in blockages). Although it is preferable to add the additional catalyst(s) to the solvent/slurry mixture immediately after exiting the injection device, they may be added to the slurry and/or solvent at any time prior to their contact in the injection device.

TABLE 2a

Source A lignite feedstock run conditions

| Run ID | Feedstock Type | Solids in slurry (% wt) | Slurry temp (° C.)/ pressure (bar) | Solvent Type | Solvent temp (° C.)/ pressure (bar) | Reaction Temp (° C.) | Reaction Pressure (bar) | Retention time (min) | Catalyst(s)/ additive(s) |
|---|---|---|---|---|---|---|---|---|---|
| Lignite-A-1 | Lignite (source A) | 16.0 | 20° C. 260bar | s/c water | 450° C. 240bar | 330° C. | 240bar | 5 | 0.1M NaOH |
| Lignite-A-2 | Lignite (source A) | 15.0 | 20° C. 260bar | s/c water | 450° C. 240bar | 340° C. | 240bar | 25 | None |
| Lignite-A-3 | Lignite (source A) | 20.00 | 20° C. 260bar | s/c water | 450° C. 240bar | 350° C. | 240bar | 25 | None |
| Lignite-A-4 | Lignite (source A) | 20.00 | 20° C. 260bar | s/c water | 450° C. 240bar | 350° C. | 240bar | 25 | None |
| Lignite-A-5 | Lignite (source A) | 22.00 | 20° C. 260bar | s/c water | 450° C. 240bar | 350° C. | 240bar | 25 | 1% wt solid iron oxide, 0.1M NaOH |
| Lignite-A-6 | Lignite (source A) | 16.00 | 20° C. 260bar | s/c water | 450° C. 240bar | 350° C. | 240bar | 25 | 1% Fe$_2$O$_3$/ 1M NaOH/ 10% Sucrose (white sugar) |
| Lignite-A-7 | Lignite (source A) | MIXED RUNS | MIXED RUNS | s/c water | MIXED RUNS | MIXED RUNS | MIXED RUNS | MIXED RUNS | 1% Fe$_2$O$_3$/ 1M NaOH/ 10% Sucrose (white sugar) |
| Lignite-A-8 | Lignite (source A) | 26.5 | 20° C. 260bar | s/c water | 450° C. 240bar | 340° C. | 240bar | 25 | 0.5% iron oxide, 6% Bannagrass, 20% lignite |
| Lignite-A-9 | Lignite (source A) | MIXED RUNS | MIXED RUNS | s/c water | MIXED RUNS | MIXED RUNS | MIXED RUNS | MIXED RUNS | MIXED RUNS |
| Lignite-A-10 | Lignite (source A) | RUNS | RUNS | s/c water | RUNS | RUNS | RUNS | RUNS | RUNS |

TABLE 2b lignocellulosic biomass feedstock and run conditions

| Run ID | Feedstock Type | Solids in slurry (% wt) | Slurry Pressure (bar)/ Temp (° C.) | Solvent Type | Solvent Pressure (bar)/ Temp (° C.) | Reaction Temp (° C.) | Reaction Pressure (bar) | Retention time (min) | Catalyst(s)/ additive(s) |
|---|---|---|---|---|---|---|---|---|---|
| Lignocell-1 | Radiata Pine | 10 | 20° C. 240bar | s/c water | 450° C. 220bar | 320° C. | 240bar | 25 | 20% ethanol, 0.4M sodium hydroxide |
| Lignocell-2 | Radiata Pine | 10 | 20° C. 240bar | s/c water | 450° C. 220bar | 320° C. | 240bar | 25 | 20% ethanol, 0.4M sodium hydroxide |
| Lignocell-3 | Radiata Pine | 10 | 20° C. 240bar | s/c water | 450° C. 220bar | 320° C. | 240bar | 25 | 20% ethanol, 0.2M sodium hydroxide |
| Lignocell-4 | Radiata Pine | 10 | 20° C. 240bar | s/c water | 450° C. 220bar | 320° C. | 240bar | 25 | 20% ethanol, 0.2M sodium hydroxide |
| Lignocell-5 | Radiata Pine | 10 | 20° C. 240bar | s/c water | 450° C. 220bar | 350° C. | 240bar | 25 | 20% ethanol, 0.4M sodium hydroxide |
| Lignocell-6 | Radiata Pine | 10 | 20° C. 240bar | s/c water | 450° C. 220bar | 350° C. | 240bar | 25 | 20% ethanol, 0.4M sodium hydroxide |
| Lignocell-7 | Radiata Pine | 10 | 20° C. 240bar | s/c water | 450° C. 220bar | 350° C. | 240bar | 25 | 16.6% Methanol, 0.4M sodium hydroxide |
| Lignocell-8 | Radiata Pine | 10 | 20° C. 240bar | s/c water | 450° C. 220bar | 350° C. | 240bar | 25 | 16.6% Methanol, 0.4M sodium hydroxide |
| Lignocell-9 | Radiata Pine | 10 | 20° C. 240bar | s/c water | 450° C. 220bar | 350° C. | 240bar | 12.5 | 20% Ethanol |
| Lignocell-10 | Radiata Pine | 10 | 20° C. 240bar | s/c water | 450° C. 220bar | 350° C. | 240bar | 12.5 | None |
| Lignocell-11 | Radiata Pine | 10 | 20° C. 240bar | s/c water | 450° C. 220bar | 350° C. | 240bar | 12.5 | 0.1M NaOH 20% Ethanol, 0.1M NaOH |
| Lignocell-12 | Radiata Pine | 10 | 20° C. 240bar | s/c water | 450° C. 220bar | 350° C. | 240bar | 12.5 | 0.1M NaOH 20% Ethanol, 0.05M NaOH |
| Lignocell-13 | Radiata Pine | 10 | 20° C. 240bar | s/c water | 450° C. 220bar | 350° C. | 240bar | 12.5 | None |
| Lignocell-14 | Radiata Pine | 10 | 20° C. 240bar | s/c water | 450° C. 220bar | 350° C. | 240bar | 12.5 | None |
| Lignocell-15 | Radiata Pine | 10 | 20° C. 240bar | s/c water | 450° C. 220bar | 350° C. | 240bar | 12.5 | None |
| Lignocell-16 | Radiata Pine | 10 | 20° C. 240bar | s/c water | 450° C. 220bar | 350° C. | 240bar | 25 | None |
| Lignocell-17 | Radiata Pine | 10 | 20° C. 240bar | s/c water | 450° C. 220bar | 350° C. | 240bar | 25 | None |
| Lignocell-18 | Radiata Pine | 10 | 20° C. 240bar | s/c water | 450° C. 220bar | 350° C. | 240bar | 25 | 0.4 NaOH |
| Lignocell-19 | Radiata Pine | 10 | 20° C. 240bar | s/c water | 450° C. 220bar | 350° C. | 240bar | 25 | 0.4M NaOH |

5. Cooling and Pressure Let-Down

Once sufficiently reacted the slurry exited the reactor and was passed through a concentric pipe cooling module. Although a cocentric pipe cooling module is described the skilled person will recognise that any other suitable cooling module may be used such as, for example, a shell and tube system. The cooling module was used as a heat exchanger to reduce the process temperature to suitable levels for the pressure let down system, and to offer an opportunity for heat recovery to improve overall thermal efficiency.

The slurry was cooled to approximately 180° C. over a period of about 5 to 30 seconds (preferably 25 seconds), the rate of cooling having been optimised to minimise solid formation and precipitation. The slurry was passed through a pressure let down system which reduced the pressure to atmospheric levels and directed the product into a collection tank. The pressure let down system is comprised of a combination of selectable, fixed orifice, parallel paths, and also a variable orifice control valve.

6. Biofuel Processing

Slurry passed through the pressure let down system entered a collection tank. The collection tank uses a water jacket or any other suitable means (e.g. in-tank tubing) to cool the slurry back to ambient temperature. Accordingly, the pressure let down system and water jacket of the collection tank facilitated an almost instantaneous depressurisation to ambient pressure and a rapid decrease in temperature from approximately 180° C. to ambient temperature.

The biofuel product was then processed for separation and refining. For lignite feedstock, the biofuel product was filtered through a pressure filter press, or rotary vacuum drum filter to facilitate the first stage of solid and liquid separation. The solid product includes a high carbon char with bound oils. The oil was separated from the char either by thermal distillation or by solvent extraction. The liquid product contains a low percentage of light oils, which were concentrated and recovered though an evaporator.

For lignocellulosic biomass feedstock (or cellulose/lignin fraction feedstock), the product can be all oil (i.e. no solid present), depending on processing conditions and the nature of the feedstock (ash-content, etc.). The majority was recovered by decanting or by density separation. There was also a small percentage of water soluble light oils which were concentrated and recovered through an evaporator. Product oils may be further polished or distilled to remove any remaining water or in preparation for further processing.

7. Biofuel Product Analysis

Biofuel product analysis was performed using standard techniques as per the brief descriptions below:

7.1 Coal/Char Analysis.

Proximate analysis including percentage of moisture, ash yield, volatile matter and fixed carbon was conducted in accordance with Australian Standard Methods AS2434.1, 2 &8.

Ultimate analysis including Carbon, Hydrogen and Nitrogen and Total Sulphur was conducted in accordance with Australian Standard Methods AS1038.6.4 and AS1038.6.3.2.

Calorific value was conducted in accordance with Australian Standard Method AS1038.5.

Analysis of ash was conducted in accordance with Australian Standard Method AS1038.14

Determination of ash fusion temperatures under an oxidising atmosphere was conducted in accordance with Australian Standard Method AS1038.15

7.2 Oil Analysis:

Ultimate analysis including Carbon, Hydrogen and Nitrogen was conducted in accordance with Australian Standard Method AS1038.6.4.

Total sulphur analysis was conducted in accordance with United States Environmental Protection Agency (USEPA) 5050 followed by inductively coupled plasma atomic emission spectroscopy (ICPAES).

Calorific value was conducted in accordance with Australian Standard Method AS1038.5.

Determination of total moisture in oils was conducted in accordance with Active Standard ATSM D6304.

Tables 3a and 3b below provides details regarding the properties of raw feedstock materials utilised in the biofuel generation process. Tables 4, 5a, 5b, and 6 below provide details regarding the properties of biofuels produced in accordance with the process.

TABLE 3a analysis of source A lignite and lignocellulosic biomass feedstock characteristics

| Feedstock | GCV (MJ/kg db) | Carbon (% wt db) | Hydrogen (% wt db) | Nitrogen (% wt db) | Sulphur (% wt db) | Oxygen (% wt db) | Molar H/C Ratio |
|---|---|---|---|---|---|---|---|
| Lignite (Source A) | 24.70 | 63.40 | 4.40 | 0.48 | 0.33 | 27.79 | 0.83 |
| Radiata Pine | 17.81 | 48.00 | 5.61 | 0.13 | 0.02 | 45.74 | 1.39 |

TABLE 3b analysis of source A lignite and lignocellulosic biomass feedstock characteristics (ash constituents)

| Feedstock | ASH CONSTITUENTS | | | | | | | |
|---|---|---|---|---|---|---|---|---|
| | $SiO_2$ (% wt db) | $Al_2O_3$ (% wt db) | $Fe_2O_3$ (% wt db) | $TiO_2$ (% wt db) | $K_2O$ (% wt db) | MgO (% wt db) | $Na_2O$ (% wt db) | CaO (% wt db) |
| Lignite (Source A) | 25.10 | 7.80 | 29.20 | 0.63 | 0.71 | 12.90 | 4.70 | 7.80 |
| Radiata Pine | 26.30 | 6.50 | 2.30 | 0.21 | 25.00 | 12.90 | 0.63 | 16.20 |

| Feedstock | ASH CONSTITUENTS | | | | | | |
|---|---|---|---|---|---|---|---|
| | $SO_3$ (% wt db) | $P_2O_5$ (% wt db) | $Mn_3O_4$ (% wt db) | SrO (% wt db) | BaO (% wt db) | ZnO (% wt db) | $V_2O_5$ (% wt db) |
| Lignite (Source A) | 12.50 | 0.11 | NA | NA | NA | NA | NA |
| Radiata Pine | 6.10 | 4.80 | 0.30 | 0.19 | 0.17 | 0.04 | <0.02 |

\# NA = not available

TABLE 4 analysis of source A lignite-derived coal oil product

| Run ID | Product Oil | | | | | | | |
|---|---|---|---|---|---|---|---|---|
| | GCV (MJ/kg db) | Carbon (% wt db) | Hydrogen (% wt db) | Nitrogen (% wt db) | Sulphur (% wt db) | Ash (% wt db) | Oxygen (% wt db) | Molar H/C Ratio |
| Lignite-A-1 | 38.48 | 82.16 | 8.80 | 0.25 | 0.18 | NA | 8.61 | 1.28 |
| Lignite-A-2 | 39.23 | 83.06 | 9.20 | 0.21 | 0.16 | NA | 7.37 | 1.32 |
| Lignite-A-3 | NA | 82.57 | 8.80 | 0.22 | NA | NA | 8.42 | 1.27 |

TABLE 4-continued analysis of source A lignite-derived coal oil product

Product Oil

| Run ID | GCV (MJ/kg db) | Carbon (% wt db) | Hydrogen (% wt db) | Nitrogen (% wt db) | Sulphur (% wt db) | Ash (% wt db) | Oxygen (% wt db) | Molar H/C Ratio |
|---|---|---|---|---|---|---|---|---|
| Lignite-A-4 | 38.63 | 82.67 | 9.20 | 0.23 | 0.16 | NA | 7.75 | 1.33 |
| Lignite-A-5 | 39.32 | 82.75 | 9.10 | 0.27 | 0.17 | NA | 7.71 | 1.31 |
| Lignite-A-6 | 36.63 | 81.77 | 9.00 | 0.19 | 0.18 | 0.01 | 8.86 | 1.31 |
| Lignite-A-7 | 38.28 | 82.48 | 8.89 | 0.32 | 0.46 | 0.22 | 7.62 | 1.28 |
| Lignite-A-8 | 38.33 | 83.47 | 8.90 | 0.28 | 0.17 | 0.02 | 7.16 | 1.27 |
| Lignite-A-9 | 38.88 | 83.37 | 8.90 | 0.29 | 0.22 | 0.09 | 7.14 | 1.27 |
| Lignite-A-10 | 35.45 | 82.02 | 6.99 | 0.16 | 0.02 | 0.33 | 10.47 | 1.02 |

NA = not available

TABLE 5a analysis of source A lignite-derived pulvarised coal injection (PCI) equivalent (char) and oil char product Ultimate and CV Analysis

| Run ID | GCV (MJ/kg db) | Carbon (% wt db) | Hydrogen (% wt db) | Nitrogen (% wt db) | Sulphur (% wt db) | Oxygen (% wt db) | Molar H/C Ratio |
|---|---|---|---|---|---|---|---|
| Lignite-A-1 | | | | | | | |
| * Char | 28.90 | 73.4 | 4.10 | 0.83 | 0.28 | 16.2 | 0.67 |
| Lignite-A-2 | | | | | | | |
| *char | 29.90 | 76.3 | 3.90 | 0.80 | 0.28 | 13.8 | 0.61 |
| *oil char | 29.10 | 73.6 | 4.40 | 0.76 | 0.31 | 16.7 | 0.71 |
| Lignite-A-3 | | | | | | | |
| *char | 30.1 | 76.4 | 4.10 | 0.87 | 0.27 | 13.3 | 0.64 |
| *oil char | 28.30 | 72.5 | 4.20 | 0.76 | 0.30 | 17.5 | 0.69 |
| Lignite-A-4 | NA | NA | NA | NA | NA | NA | NA |
| Lignite-A-5 | | | | | | | |
| *char | 32.0 | 74.1 | 5.00 | 0.79 | 0.29 | 14.9 | 0.80 |
| *oil char | 29.8 | 75.8 | 4.20 | 0.87 | 0.27 | 12.1 | 0.66 |
| Lignite-A-6 | | | | | | | |
| *char | 30.2 | 74.6 | 5.00 | 0.74 | 0.26 | 13.9 | 0.80 |
| *oil char | 29.8 | 74.7 | 4.50 | 0.81 | 0.25 | 13.0 | 0.72 |
| Lignite-A-7 | NA | NA | NA | NA | NA | NA | NA |
| Lignite-A-8 | | | | | | | |
| *char | 28.3 | 72.8 | 4.60 | 0.65 | 0.30 | 14.6 | 0.75 |
| *oil char | 29.6 | 74.5 | 3.90 | 0.85 | 0.26 | 13.3 | 0.62 |
| Lignite-A-9 | NA | NA | NA | NA | NA | NA | NA |
| Lignite-A-10 | NA | NA | NA | NA | NA | NA | NA |

NA = not available

TABLE 5b analysis of source A lignite-derived pulvarised coal injection (PCI) equivalent (char) and oil char product (ash constituents)

ASH CONSTITUENTS

| Run ID | $SiO_2$ (% wt db) | $Al_2O_3$ (% wt db) | $Fe_2O_3$ (% wt db) | $TiO_2$ (% wt db) | $K_2O$ (% wt db) | MgO (% wt db) | $Na_2O$ (% wt db) | CaO (% wt db) | $SO_3$ (% wt db) | $P_2O_5$ (% wt db) |
|---|---|---|---|---|---|---|---|---|---|---|
| Lignite-A-1 | | | | | | | | | | |
| * Char | 13.40 | 7.20 | 31.90 | 0.53 | 11.70 | 10.20 | 12.50 | 11.70 | 0.68 | NA |
| Lignite-A-2 | | | | | | | | | | |
| *char | 18.70 | 9.40 | 37.90 | 0.68 | 0.58 | 12.10 | 2.20 | 8.90 | 8.20 | 0.23 |
| *oil char | 18.10 | 9.00 | 36.90 | 0.67 | 0.41 | 11.50 | 1.40 | 7.90 | 7.90 | 0.18 |

TABLE 5b-continued analysis of source A lignite-derived pulvarised coal injection (PCI) equivalent (char) and oil char product (ash constituents)

| | ASH CONSTITUENTS | | | | | | | | | |
|---|---|---|---|---|---|---|---|---|---|---|
| Run ID | $SiO_2$ (% wt db) | $Al_2O_3$ (% wt db) | $Fe_2O_3$ (% wt db) | $TiO_2$ (% wt db) | $K_2O$ (% wt db) | MgO (% wt db) | $Na_2O$ (% wt db) | CaO (% wt db) | $SO_3$ (% wt db) | $P_2O_5$ (% wt db) |
| Lignite-A-3 | | | | | | | | | | |
| *char | 18.50 | 9.40 | 38.70 | 0.78 | 0.57 | 10.90 | 1.70 | 7.80 | 8.40 | 0.24 |
| *oil char | NA | NA | NA | NA | NA | NA | NA | NA | NA | NA |
| Lignite-A-4 | NA | NA | NA | NA | NA | NA | NA | NA | NA | NA |
| Lignite-A-5 | | | | | | | | | | |
| *char | 5 | 5.2 | 58 | 0.26 | 0.47 | 9.4 | 2.4 | 7.9 | 10 | 0.18 |
| *oil char | 11.9 | 6.6 | 47.2 | 0.50 | 0.66 | 10 | 4.4 | 7.7 | 9.5 | 0.16 |
| Lignite-A-6 | | | | | | | | | | |
| *char | 19.00 | 8.30 | 45.50 | 0.79 | 0.49 | 8.60 | 2.30 | 6.80 | 6.30 | 0.17 |
| *oil char | NA | NA | NA | NA | NA | NA | NA | NA | NA | NA |
| Lignite-A-7 | NA | NA | NA | NA | NA | NA | NA | NA | NA | NA |
| Lignite-A-8 | | | | | | | | | | |
| *char | 29.2 | 9.1 | 43.6 | 0.78 | 0.86 | 6.4 | 1.5 | 5.8 | 3.1 | 0.68 |
| *oil char | 26.10 | 8.60 | 46.90 | 0.63 | 0.90 | 6.60 | 1.80 | 5.60 | 3.90 | 0.77 |
| Lignite-A-9 | NA | NA | NA | NA | NA | NA | NA | NA | NA | NA |
| Lignite-A-10 | NA | NA | NA | NA | NA | NA | NA | NA | NA | NA |

NA = not available

TABLE 6 analysis of lignocellulosic matter-derived bio-oil poduct

| | Product Oil | | | | | | | |
|---|---|---|---|---|---|---|---|---|
| Run ID | GCV (MJ/kg db) | Carbon (% wt db) | Hydrogen (% wt db) | Nitrogen (% wt db) | Sulphur (% wt db) | Ash (% wt db) | Oxygen (% wt db) | Molar H/C Ratio |
| Lignocell-1 | 35.93 | 78.64 | 6.86 | 0.17 | 0.03 | NA | 14.30 | 1.04 |
| Lignocell-2 | 32.09 | 67.05 | 7.80 | 0.48 | 0.10 | NA | 24.58 | 1.39 |
| Lignocell-3 | 38.86 | 78.98 | 6.77 | 0.18 | 0.07 | NA | 14.00 | 1.02 |
| Lignocell-4 | 31.27 | 65.87 | 7.66 | 0.04 | 0.01 | NA | 26.42 | 1.38 |
| Lignocell-5 | 34.93 | 78.87 | 7.20 | 0.20 | 0.04 | 1.70 | 11.99 | 1.09 |
| Lignocell-6 | 34.16 | 77.95 | 7.19 | 0.18 | 0.03 | 0.70 | 13.95 | 1.10 |
| Lignocell-7 | 34.86 | 79.09 | 7.02 | 0.16 | 0.03 | 1.02 | 12.67 | 1.06 |
| Lignocell-8 | 31.67 | 69.80 | 7.61 | 0.07 | 0.03 | NA | 22.49 | 1.30 |
| Lignocell-9 | 31.5 | 71.7 | 7 | 0.14 | 0.07 | 0.3 | 20.79 | 1.16 |
| Lignocell-10 | 30.4 | 69.7 | 6.7 | 0.09 | 0.03 | 0.1 | 23.38 | 1.15 |
| Lignocell-11 | 31.8 | 73.1 | 6.9 | 0.08 | 0.03 | 0.1 | 19.79 | 1.12 |
| Lignocell-12 | 30.3 | 69.2 | 6.7 | 0.1 | 0.02 | 0.1 | 23.88 | 1.15 |
| Lignocell-13 | 31.7 | 72.9 | 6.8 | 0.11 | 0.02 | 0.2 | 19.97 | 1.11 |
| Lignocell-14 | 28.5 | 68.6 | 6.9 | 0.09 | 0.24 | NA | 24.17 | 1.20 |
| Lignocell-15 | NA | 81.1 | 8.8 | 0.01 | NA | NA | 10.09 | 1.29 |
| Lignocell-16 | 32.1 | 74.7 | 6.8 | 0.14 | NA | NA | 18.36 | 1.08 |
| Lignocell-17 | 33 | 74.6 | 6.6 | 0.11 | NA | NA | 18.69 | 1.05 |
| Lignocell-18 | 35.1 | 81.1 | 7.2 | 0.06 | 0.02 | 1.2 | 10.42 | 1.06 |
| Lignocell-19 | 35.4 | 82.1 | 7.2 | 0.08 | 0.01 | 0.3 | 10.31 | 1.04 |

NA = not available

Example 2: Conversion of Lignite from Source B to Biofuel

1. Feed Preparation 1.1 Grinding

Lignite from source B was wet ground using a ball mill to a size distribution capable of being passed through a 130μ screen. The material was then passed through a wet sieve using high pressure water and subsequently decanted to a desired slurry concentration. The choice of grinding systems is of little technical consequence with the cost of grinding being the overriding criteria in choosing a suitable technology for the process. The final grind size is related to calculated system flow characteristics, reaction times and the pressure let down system requirements.

1.2. Mixing

Lignite slurry concentrations of 20-30% solids were utilised. Sufficient material was kept stirred in batch tanks for a 4 hour run to be completed.

1.3 Pressure Pumping

Cold slurry was pressurised using a positive displacement pump that uses a variable speed drive system controlled by the PLC.

2. Product Reaction

The pressurised slurry was then combined with supercritical steam and the material brought to the required operating temperature. Source B lignite with its higher ash content (as compared to that of Source A Lignite in Example 1 above) appears to react as if an external catalyst had been added and yields products that are slightly superior to those derived from the catalysed processing of Source A Lignite.

The slurry then passed through the reaction chamber before passing it through a cooling circuit. During the reaction the lignite was converted to an upgraded coal product and a synthetic oil. As the major fraction of the oils is hydrophobic it immediately attaches to the solid carbon product as the product stream is cooled and depressurised.

2.1 Reaction Conditions

Reactor data for the runs is shown below in Table 7.

matic compounds this could be at the detriment to the synthetic oil quality 2.3 Cooling and Pressure Let Down The slurry was cooled to an optimum temperature (e.g. 160° C.-200° C.) and then passes to the pressure let down system where the pressure is reduced to atmospheric. The slurry was discharged in a manner that reduced the loss of volatile (oil) compounds that exit with the flare gases. The slurry was then cooled further and pumped to the separation stage.

In the present case heat for the front end of the process is simply released to the atmosphere via a small cooling tower.

TABLE 7 reactor data from runs

| | | |
|---|---|---|
| Overall order of the reaction | Not Applicable | |
| activation energy without catalyst | Not Applicable | kJ/kg coal |
| activation energy with catalyst | Not Applicable | kJ/kg coal |
| heat of reaction without catalyst | Not Available | kJ/kg coal |
| heat of reaction with catalyst | Not Available | kJ/kg coal |
| temperature of the fluid entering the reactor | 350 | ° C. |
| pressure of the fluid entering the reactor | 240 | Bar |
| viscosity of fluid entering the reactor | $8.1 \times 10^{-5}$ | Pa · S |
| density of the fluid entering the reactor | 640-660 | Kg/m3 |
| mean velocity of the fluid flowing through the reactor | 3 | Cm/s |
| residence time of the fluid in the reactor | 25 | Min |
| total length of reactor | 48 | M |
| internal diameter of reactor | 2 | Inch |
| fluid flow regime inside reactor | Homogeneous/turbulent | slug/annular/homogenous/other |
| residence time distribution plot | Not Available | |
| superficial gas velocity inside reactor | Not Applicable | m/s |
| superficial solid velocity inside reactor | 3 | Cm/s |
| dispersion coefficient of coal solid within gas | Not Applicable | m2/s |
| temperature of the fluid leaving the reactor | 350 | ° C. |
| pressure of the fluid leaving the reactor | 240 | Barg |
| viscosity of fluid leaving the reactor | Not Available | cP |
| density of the fluid leaving the reactor | Not Available | kg/m3 |

Product reactions for the baseline run with no additional external catalyst were performed at the conditions outlined in Table 8 below.

However, it should be noted that the cooling circuit could be modified to contain heat exchangers to recover heat for the front end of the process and achieve good overall energy

TABLE 8

Source B lignite feedstock run conditions

| Run ID | Feedstock Type | Solids in slurry (% wt) | Slurry Pressure (bar)/ Temp (° C.) | Solvent Type | Solvent Pressure (bar)/ Temp (° C.) | Reaction Temp (° C.) | Reaction Pressure (bar) | Retention time (min) | Catalyst(s)/ additive(s) |
|---|---|---|---|---|---|---|---|---|---|
| Lignite-B-1 | Lignite (source B) | 10 | 260bar 20° C. | s/c water | 450° C. 240bar | 350° C. | 230-240bar | 25 | None |
| Lignite-B-2 | Lignite (source B) | 10 | 260bar 20° C. | s/c water | 450° C. 240bar | 350° C. | 230-240bar | 25 | None |
| Lignite-B-3 | Lignite (source B) | 10 | 260bar 20° C. | s/c water | 450° C. 240bar | 350° C. | 230-240bar | 25 | 0.2M NaOH |
| Lignite-B-4 | Lignite (source B) | 10 | 260bar 20° C. | s/c water | 450° C. 240bar | 350° C. | 230-240bar | 25 | 0.2M NaOH |
| Lignite-B-5 | Lignite (source B) | 10 | 260bar 20° C. | s/c water | 450° C. 240bar | 350° C. | 230-240bar | 25 | 0.1M NaOH |

2.2 Auto-Catalysis and Additional Catalyst

In some cases, additional catalysts were included (see Table 4) to improve reaction rates at lower temperatures and pressures. It also needs to be noted that increase in oil yield does not necessarily mean increase in oil quality. If, for example, the increase in oil yield were made up of polyaroefficiency. This could be achieved using a hot oil recovery system or a steam re-boiler.

2.4 Gas Flare

Gases produced in the reaction and were released from the let down tank after passing through a condenser to capture any fugitive product. The gas flow was analysed as shown in FIG. 5 and passed to a flare for combustion.

|  | Oxygen | Nitrogen | Hydrogen | Methane | Carbon Monoxide | Carbon Dioxide | Ethylene/Acetylene | Ethane | Propane | Total |
|---|---|---|---|---|---|---|---|---|---|---|
| ■Measured 14:38 | 12.0 | 52.7 | 0.42 | 1.06 | 1.98 | 42.0 | 0.10 | 0.27 | 0.16 | 111 |
| ■Measured 14:42 | 11.3 | 49.3 | 0.43 | 1.16 | 2.06 | 46.1 | 0.11 | 0.30 | 0.17 | 111 |
| □Normalised 14:38 | 0.0 | 0.0 | 0.91 | 2.30 | 4.30 | 91.3 | 0.21 | 0.58 | 0.35 | 100 |
| □Normalised 14:42 | 0.0 | 0.0 | 0.85 | 2.31 | 4.09 | 91.6 | 0.21 | 0.60 | 0.34 | 100 |

Figure 5:
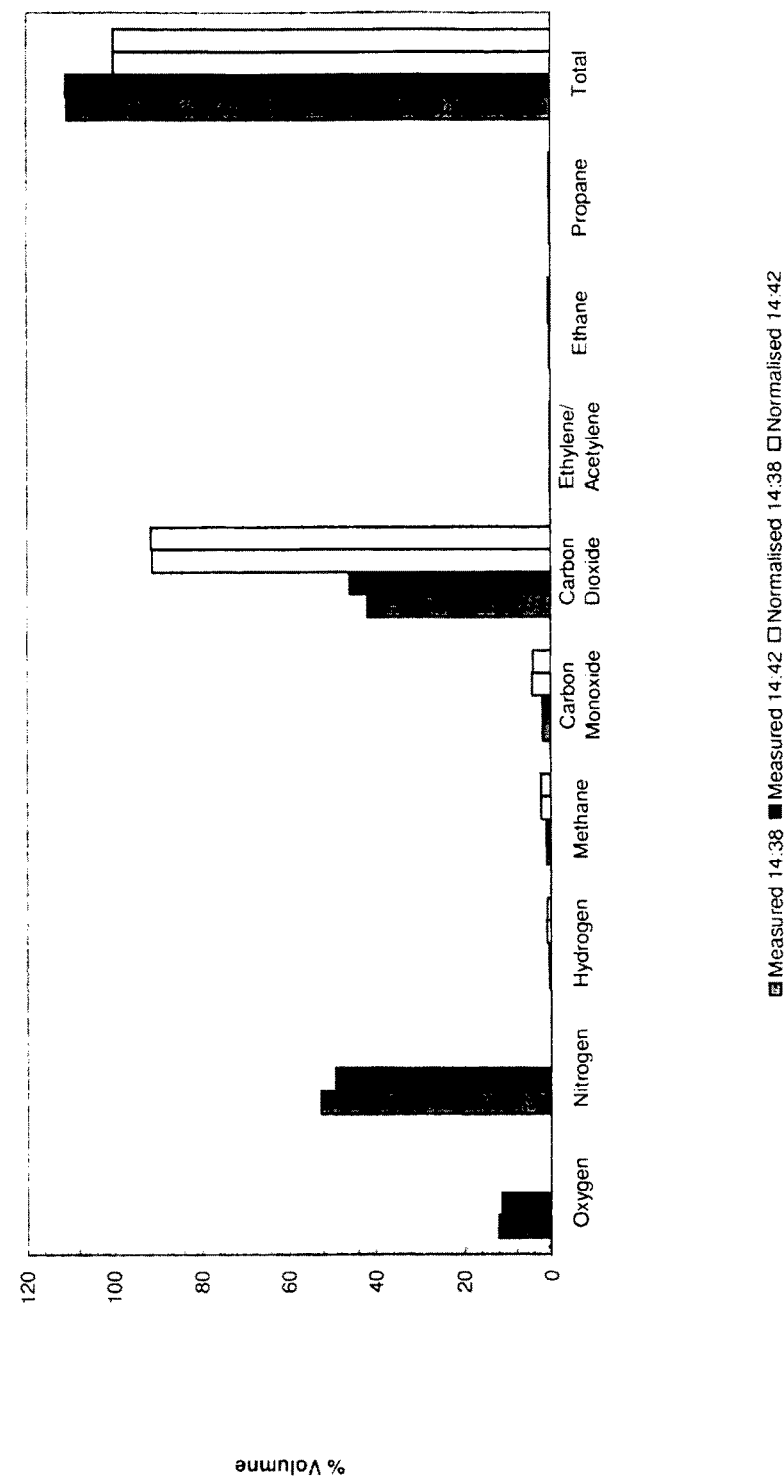
FIG. 5 is a bar graph showing a gas flow analysis. Bar coding is as follows: ■Measured 14:38 ■Measured 14:42 ☐Normalised 14:38 ☐Normalised 14:42

The results shown in FIG. 5 and summarised above are normalised by subtracting the nitrogen and oxygen (as they are simply present from residual air in the let-down tank). The concentrations of any unidentified gases are also assumed to be insignificant.

3. Product Separation

Two stages to separate the desirable material from the water were utilised:
(i) Filtration
(ii) Thermal distillation of the oil from the carbon.

3.1 Filtration

Filtration was performed using either a small or large batch system. The larger system consists of a rotating drum vacuum filter that leads directly into the larger scale distillation system. In the small batch system the cooled slurry was passed through a pressure leaf filter to remove the oil/char solids.

3.2 Thermal Distillation

Solids conveyed to the Thermal Distillation unit oil were separated from the carbon using a small scale conventional thermal distillation unit to 450° C. Distillation units are externally heated chambers and vapours generated were passed through a spray condenser. Oil was then collected with the condensate and decanted from the remaining water.

3.3 Soxhlet Yield Determination

Several samples from the filter press were processed using a Soxhlet extraction system with tetrahydro furan (THF) as the solvent. This allowed for the calculation of the yield of extractable oil material. Results for both the standard runs and the additional catalyst runs were in the range of 24-26% extractable yield.

4. Product Results

4.1 Feedstock Analysis

Tables 9a and 9b below provide details regarding the properties of raw feedstock materials utilised in the biofuel generation process.

4.2 Oil Analysis

Oil extracted via thermal distillation was analysed using the following methods:

% ash yield analysis was conducted in accordance with AS2434.8 methods.

Ultimate analysis including Carbon, Hydrogen and Nitrogen was conducted in accordance with AS1038.6.4.

Total sulphur analysis was conducted in accordance with USEPA 5050 followed by ICPAES.

Calorific value was conducted in accordance with AS1038.5.

Analysis of ash was conducted in accordance with AS1038.14

Determination of total moisture in oils was conducted in accordance with D6304, Proc A

4.3 Upgraded Coal

Coal recovered from the thermal distillation (oil removal step) is referred to as "Upgraded Coal" as it has similar properties to higher quality black coal. The upgraded coal was analysed using the following methods:

Proximate analysis including % moisture, % ash yield, volatile matter and fixed carbon was conducted in accordance with AS2434.1, 2 & 8 methods.

Ultimate analysis including Carbon, Hydrogen and Nitrogen and Total Sulphur was conducted in accordance with AS1038.6.4 and AS1038.6.3.2.

Calorific value was conducted in accordance with AS1038.5.

Analysis of ash was conducted in accordance with AS1038.14

Determination of ash fusion temperatures under an oxidising atmosphere was conducted in accordance with AS1038.15

Raw analysis results for standard and additional catalyst runs were adjusted for moisture content and are shown in Tables 10a-10c below.

TABLE 9a analysis of source B lignite feedstock characteristics

| Feedstock | GCV (MJ/kg db) | Carbon (% wt db) | Hydrogen (% wt db) | Nitrogen (% wt db) | Sulphur (% wt db) | Oxygen (% wt db) | Molar H/C Ratio |
|---|---|---|---|---|---|---|---|
| Lignite (Source B) | 26.00 | 64.30 | 4.90 | 0.79 | 0.70 | 23.31 | 0.91 |

TABLE 9b analysis of source B lignite feedstock characteristics (ash constituents)

| | ASH CONSTITUENTS | | | | | | | | | |
|---|---|---|---|---|---|---|---|---|---|---|
| Feedstock | $SiO_2$ (% wt db) | $Al_2O_3$ (% wt db) | $Fe_2O_3$ (% wt db) | $TiO_2$ (% wt db) | $K_2O$ (% wt db) | $MgO$ (% wt db) | $Na_2O$ (% wt db) | $CaO$ (% wt db) | $SO_3$ (% wt db) | $P_2O_5$ (% wt db) |
| Lignite (Source B) | 23.70 | 5.50 | 15.30 | 0.28 | 0.19 | 7.10 | 0.10 | 30.70 | 16.90 | 0.10 |

TABLE 10a analysis of source B lignite-derived coal oil product

Product Oil

| Run ID | GCV (MJ/kg db) | Carbon (% wt db) | Hydrogen (% wt db) | Nitrogen (% wt db) | Sulphur (% wt db) | Ash (% wt db) | Oxygen (% wt db) | Molar H/C Ratio |
|---|---|---|---|---|---|---|---|---|
| Lignite-B-1 | 39.42 | 82.95 | 9.29 | 0.26 | 0.33 | 0.10 | 7.06 | 1.34 |
| Lignite-B-2 | 31.62 | 77.05 | 7.68 | 0.47 | 0.37 | 2.52 | 11.91 | 1.19 |
| Lignite-B-3 | 39.64 | 84.73 | 9.08 | 0.30 | 0.33 | 0.10 | 5.45 | 1.28 |
| Lignite-B-4 | 36.38 | 79.27 | 8.39 | 0.45 | 0.41 | 0.30 | 11.18 | 1.26 |
| Lignite-B-5 | 39.34 | 83.28 | 9.20 | 0.24 | 0.38 | 0.10 | 6.80 | 1.32 |

TABLE 10b analysis of source B lignite-derived pulvarised coal injection (PCI) equivalent (char) and oil char product Ultimate and CV Analysis

| Run ID | GCV (MJ/kg db) | Carbon (% wt db) | Hydrogen (% wt db) | Nitrogen (% wt db) | Sulphur (% wt db) | Oxygen (% wt db) | Molar H/C Ratio |
|---|---|---|---|---|---|---|---|
| Lignite-B-1 | | | | | | | |
| *char | 30.20 | 76.5 | 4.10 | 0.95 | 0.49 | 10.2 | 0.64 |
| *oil char | 29.80 | 72.8 | 5.20 | 0.87 | 0.59 | 13.9 | 0.85 |
| Lignite-B-3 | | | | | | | |
| *char | 30.80 | 77.8 | 4.00 | 0.90 | 0.50 | 9.5 | 0.61 |
| *oil char | 30.50 | 75.5 | 4.90 | 0.79 | 0.50 | 12.0 | 0.77 |
| Lignite-B-5 | | | | | | | |
| *char | 30.20 | 76.2 | 4.20 | 0.89 | 0.34 | 11.1 | 0.66 |
| *oil char | 30.30 | 75.1 | 5.20 | 0.79 | 0.44 | 12.2 | 0.82 |

TABLE 10c analysis of source B lignite-derived pulvarised coal injection (PCI) equivalent (char) and oil char product (ash constituents)

ASH CONSTITUENTS

| Run ID | $SiO_2$ (% wt db) | $Al_2O_3$ (% wt db) | $Fe_2O_3$ (% wt db) | $TiO_2$ (% wt db) | $K_2O$ (% wt db) | MgO (% wt db) | $Na_2O$ (% wt db) | CaO (% wt db) | $SO_3$ (% wt db) | $P_2O_5$ (% wt db) |
|---|---|---|---|---|---|---|---|---|---|---|
| Lignite-B-1 | | | | | | | | | | |
| *char | 23.00 | 7.30 | 29.90 | 0.44 | 0.38 | 7.10 | 0.60 | 18.50 | 14.20 | 0.05 |
| *oil char | NA | NA | NA | NA | NA | NA | NA | NA | NA | NA |
| Lignite-B-3 | | | | | | | | | | |
| *char | 24.80 | 8.20 | 29.00 | 0.56 | 0.41 | 9.10 | 1.60 | 16.30 | 12.40 | 0.10 |
| *oil char | NA | NA | NA | NA | NA | NA | NA | NA | NA | NA |
| Lignite-B-5 | | | | | | | | | | |
| *char | 28.80 | 9.00 | 28.00 | 0.66 | 0.40 | 9.80 | 1.60 | 14.80 | 8.00 | 0.11 |
| *oil char | NA | NA | NA | NA | NA | NA | NA | NA | NA | NA |

4. Conclusions

Processing of lignite feedstock from sources A and B produced economically valuable products (an upgraded high energy density coal and a synthetic oil) having the potential to be upgraded for use in the transport industry in an overall much more environmentally acceptable manner than that of competing technologies.

Example 3: Additional Process Conditions

In addition to the aforementioned process conditions (Examples 1 and 2 above) in which product characteristics have been analysed, the following process conditions in Table 11 below have been utilised. Product data for some of the run conditions shown in Table 11 are provided in Examples 1 and 2 above.

TABLE 11

| | Run Conditions | | | | | |
|---|---|---|---|---|---|---|
| Run | Pressure (bar) | Temperature (bar) | Solids (%) | Retention (min) | Additives/catalysts | Feedstock |
| 1 | 240 | 350 | 25.0% | 25 | | Lignite |
| 2 | 240 | 350 | 25.0% | 0 | | Lignite |
| 3 | 250 | 350 | 20.0% | 25 | No additive | Lignite |
| 4 | 240 | 350 | 22.0% | 25 | 0.1M NaOH, Fe2O3 1% wt of solids | Lignite |
| 5 | 240 | 350 | 22.0% | 25 | 0.1M NaOH, Fe2O3 1% wt of solids | Lignite |
| 6 | 240 | 350 | 22.0% | 25 | 0.1M NaOH, Fe2O3 1% wt of solids | Lignite |
| 7 | 240 | 350 | 22.0% | 25 | Sucrose 1:5 lignite, 0.1M NaOH, Fe2O3 1% wt of solids | Lignite |
| 8 | 240 | 350 | 22.0% | 25 | Sucrose 1:5 lignite, 0.1M NaOH, Fe2O3 1% wt of solids | Lignite |
| 9 | 240 | 350 | 22.0% | 25 | Sucrose 1:5 lignite, 0.1M NaOH, Fe2O3 1% wt of solids | Lignite |
| 10 | 240 | 350 | 22.0% | 25 | Sucrose 1:5 lignite, 0.1M NaOH, Fe2O3 1% wt of solids | Lignite |
| 11 | 240 | 350 | 22.0% | 25 | Sucrose 1:5 lignite, 0.1M NaOH, Fe2O3 1% wt of solids | Lignite |
| 12 | 240 | 350 | 22.0% | 25 | Sucrose 1:5 lignite, 0.1M NaOH, Fe2O3 1% wt of solids | Lignite |
| 13 | 240 | 350 | 22.0% | 25 | Bana 1:3.5 lignite, 0.1M NaOH, Fe2O3 1% wt of solids | Lignite |
| 14 | 240 | 350 | 22.0% | 25 | Bana 1:3.5 lignite, Fe2O3 1% wt of solids | Lignite |
| 15 | 240 | 350 | 22.0% | 25 | 0.1M NaOH Production Run | Lignite |
| 16 | 240 | 350 | 22.0% | 25 | No additive Production Run | Lignite |
| 17 | 215 | 325 | 18.0% | 25 | No additive Production Run | Lignite |
| 18 | 240 | 350 | 22.0% | 25 | No additive Production Run | Lignite |
| 19 | 240 | 350 | 22.0% | 25 | No additive Production Run | Lignite |
| 20 | 240 | 350 | 22.0% | 25 | No additive Production Run | Lignite |
| 21 | 240 | 350 | 22.0% | 25 | No additive Production Run | Lignite |
| 22 | 240 | 350 | N/A | 25 | 10:2:8, Coal, Ethanol, Engine oil. 0.1M NaOH | Lignite |
| 23 | | 240 | | | 10:2:8, Coal, Ethanol, Mineral oil + 0.1M NaOH | Lignite |
| 24 | | 240 | | | 10:2:8, Coal, Ethanol, Mineral oil + 0.1M NaOH | Lignite |
| 25 | 240 | 350 | 22 | 25 | No additive | Lignite |
| 26 | 240 | 350 | 0.22 | 25 | 2% Pyrite | Lignite |
| 27 | 240 | 350 | 0.22 | 25 | Steam Diffuser Trial | Lignite |
| 28 | 240 | 350 | 0.22 | 25 | Steam Diffuser Trial | Lignite |
| 29 | 240 | 350 | 0.22 | 25 | Spigot mixer | Lignite |
| 30 | 240 | 350 | 0.22 | 25 | Y mixing chamber | Lignite |
| 31 | 240 | 350 | 0.22 | 25 | No additive | Lignite |
| 32 | 240 | 350 | 0.22 | 25 | 0.2M NaOH | Lignite |
| 33 | 240 | 350 | 0.22 | 25 | 0.1M NaOH | Lignite |
| 34 | 240 | 350 | 0.22 | 25 | No additive | Lignite |
| 35 | 240 | 350 | 0.22 | 25 | No additive | Lignite |
| 36 | 240 | 350 | 0.22 | 25 | HCOONa 6% (of lignite) | Lignite |
| 37 | 240 | 350 | 0.22 | 25 | 0.1M NaOH | Lignite |
| 38 | 240 | 350 | 0.22 | 12.5 | No additive | Lignite |
| 39 | 240 | 350 | 12.5 | 12.5 | No additive | Lignite |
| 40 | 240 | 350 | 25 | 25 | No additive | Lignite |
| 41 | 220 | 320 | 10.0% | 25 | 20% wt ethanol, 0.2M NaOH | Radiata Pine |
| 42 | 220 | 320 | 10.0% | 25 | 20% wt ethanol, 0.4M NaOH | Radiata Pine |
| 43 | 220 | 350 | 10.0% | 25 | 20% wt ethanol, 0.4M NaOH | Radiata Pine |

TABLE 11-continued process conditions also utilised

| | Run Conditions | | | | | |
|---|---|---|---|---|---|---|
| Run | Pressure (bar) | Temperature (bar) | Solids (%) | Retention (min) | Additives/catalysts | Feedstock |
| 44 | 220 | 350 | 10.0% | 25 | 15% wt methanol, 0.4M NaOH | Radiata Pine |
| 45 | 240 | 350 | 10.0% | 25 | 20% wt ethanol, 0.4M NaOH | Radiata Pine |
| 46 | 220 | 320 | 10.0% | 5 | 20% wt ethanol | Radiata Pine |

In addition, despite not yet having been performed, it is envisaged that the following process conditions in Table 12 below may be beneficial to utilise.

TABLE 12 suitable process conditions that may be utilised

| | Run Conditions | | | | | |
|---|---|---|---|---|---|---|
| Run Date | Pressure (bar) | Temperature (bar) | Solids (%) | Retention (min) | Additives/catalysts | Feedstock |
| NA | 240 | 350 | 25 | 25 | No additive | Lignite |
| NA | 240 | 350 | 25 | 25 | Ethanol - 20% in Feedstock | Lignite |
| NA | 240 | 350 | 5 | 5 | 0.1M NaOH | Lignite |
| NA | 240 | 350 | 10 | 10 | 0.1M NaOH | Lignite |
| NA | 240 | 350 | 25 | 25 | Baseline Ethanol, Mineral oil + 0.1M NaOH | Lignite |
| NA | 240 | 350 | 25 | 25 | 10:2:8, Coal, Ethanol, Mineral oil + 0.1M NaOH | Lignite |
| NA | 240 | 350 | 25 | 25 | | EL 4416 |
| NA | 220 | 320 | 10.0% | 5 | 20% wt ethanol, 0.4M NaOH | Radiata Pine |
| NA | 220 | 320 | 10.0% | 5 | 0.4M NaOH | Radiata Pine |
| NA | 220 | 350 | 10.0% | 25 | Pyrite, Methanol | Radiata Pine |
| NA | 220 | 350 | 10.0% | 25 | Recycled waste water | Radiata Pine |
| NA | 220 | 350 | 10.0% | 25 | 20% coal, TBA | Radiata Pine |
| NA | 220 | 320 | 10.0% | 25 | 0.2M NaOH (no ethanol) | Radiata Pine |
| NA | 220 | 350 | 10.0% | 12.5 | TBA | Radiata Pine |
| NA | 220 | 320 | 10.0% | 25 | 5% wt ethanol | Radiata Pine |
| NA | 220 | 320 | 10.0% | 25 | 5% wt methanol | Radiata Pine |
| NA | 220 | 350 | 10.0% | 25 | 5% wt methanol | Radiata Pine |
| NA | 220 | 350 | 10.0% | 25 | Concentrated Phenolics | Radiata Pine |

NA = not applicable (run not yet performed)

INCORPORATION BY REFERENCE

This application claims priority from Australian provisional patent application number 2010902938 filed on 1 Jul. 2010, the entire contents of which are incorporated herein by reference.

The invention claimed is:

1. A method for producing a bio-oil from organic matter selected from the group consisting of: lignocellulosic matter comprising more than about 5% lignin by weight, more than about 5% cellulose by weight, and more than about 5% hemicellulose by weight; coal; oil shale; peat; and coke; the method comprising the steps of:
   (i) generating a supercritical aqueous solvent prior to contacting the supercritical aqueous solvent with the organic matter;
   (ii) contacting the organic matter with the supercritical aqueous solvent to form a reaction mixture, wherein said contacting causes a supercritical to subcritical phase change in the aqueous solvent; and
   (iii) treating the reaction mixture formed in step (ii) for a period of one to sixty minutes at a temperature of between about 250° C. and about 400° C. and a pressure of between about 100 bar and about 300 bar to thereby produce the bio-oil.

2. The method according to claim 1, wherein the organic matter of step (ii) is at a temperature or pressure below the critical point of the aqueous solvent prior to said contacting.

3. The method according to claim 1, wherein the organic matter of step (ii) is at a temperature and a pressure below the critical point of the aqueous solvent prior to said contacting.

4. The method according to claim 1, wherein said contacting and treating are performed under conditions of continuous flow.

5. The method according to claim 1, wherein the reaction mixture comprises a first additional catalyst and said first catalyst is a base catalyst, an alkali metal hydroxide catalyst, or a transition metal hydroxide catalyst.

6. The method according to claim 5, wherein the first additional catalyst is a base catalyst selected from sodium hydroxide or potassium hydroxide.

7. The method according to claim 5, wherein the reaction mixture comprises at least one second additional catalyst selected from the group consisting of acid catalysts, reactive carboxylic acid catalysts, alkali metal formate catalysts, transition metal formate catalysts, transition metal catalysts, supported transition metal catalysts, solid acid catalysts, noble metal catalysts, sulphide catalysts, water-gas-shift catalysts, and combinations thereof.

8. The method according to claim 7, wherein the at least one second additional catalyst is sodium formate.

9. The method according to claim 5, wherein the additional catalyst or additional catalysts is/are added to the reaction mixture after said contacting of the organic matter with the supercritical aqueous solvent.

10. The method according to claim 1, wherein said organic matter is fossilised organic matter having a carbon content of at least 50%, and said supercritical aqueous solvent is water and wherein:
said temperature of step (iii) is between about 270° C. and about 380° C., and said pressure of step (iii) is between about 150 bar and about 270 bar.

11. The method according to claim 1, wherein said organic matter is lignocellulosic matter.

12. The method according to claim 11, wherein:
said temperature of step (iii) is between about 270° C. and about 380° C., said pressure of step (iii) is between about 150 bar and about 270 bar, and said reaction mixture comprises between about 5% and about 40% alcohol by weight.

13. The method according to claim 1, wherein said method comprises the steps of:
(i) cooling the reaction mixture to a temperature of between about 160° C. and about 200° C. in a time period of less than about 30 seconds after said treating; and
(ii) depressurisation and cooling the reaction mixture to ambient temperature by release through a pressure let down device.

14. The method according to claim 1, wherein said biofuel comprises an oil component having a gross calorific value of more than 35 MJ/kg, greater than about 8 percent weight dry basis (% wt db) hydrogen, and less than about 10% wt db oxygen.

15. A continuous flow apparatus for converting organic matter into biofuel, the apparatus comprising:
an injection device arranged to bring a supercritical solvent into direct contact with the organic matter, thereby facilitating a supercritical to subcritical phase change in the solvent;
one or more pumps for propelling the organic matter and supercritical solvent separately and under pressure into the injection device;
a reactor in communication with the injection device and operable to maintain the organic matter and solvent at a target temperature and pressure for a defined time period; and
a pressure let-down device.

16. The apparatus according to claim 15, wherein said injection device comprises:
(i) first, second and third vessels each inserted into separate orifices of a sealed connecting piece, the first vessel passing through the connecting piece terminating within the third vessel and being operable to direct flow of material into the third vessel, and the connecting piece being operable to direct flow of material received from the second vessel into the third vessel for contact with material from the first vessel;
(ii) second and third vessels each in communication at a common junction, the first and second vessels being operable to direct flow of separate materials into the junction where said materials contact forming a mixture, and the third vessel being operable to direct flow of the mixture away from the junction; or
(iii) a first outer vessel enclosing a second porous inner vessel, the second porous inner vessel passing entirely through the first outer vessel, and the first outer vessel comprising at least one orifice for receiving material for dissemination along a surface of the second porous inner vessel.

17. The method according to claim 1, wherein said organic matter is fossilised organic matter having a carbon content of at least 50%, and said supercritical aqueous solvent is water and wherein:
said temperature of step (iii) is between about 330° C. and about 370° C., and said pressure of step (iii) is between about 200 bar and about 280 bar.

18. The method according to claim 11, wherein:
said temperature is between about 300° C. and about 340° C., said pressure is between about 180 bar and about 260 bar, and said reaction mixture comprises between about 10% and about 30% alcohol by weight relative to content in the reaction mixture.

19. The method according to claim 11, wherein said lignocellulosic matter comprises more than about 10% by weight of each of lignin, cellulose, and hemicellulose.

20. The method according to claim 11, wherein said lignocellulosic matter comprises between about 15% and about 40% by weight of hemicellulose, between about 30% and about 60% by weight of cellulose, and between about 5% and about 40% by weight of lignin.

21. The method according to claim 11, wherein said lignocellulosic matter comprises between about 20% and about 35% by weight of lignin, between about 20% and about 45% by weight of cellulose, and between about 20% and about 35% by weight of hemicellulose.

* * * * *